United States Patent [19]

Kashiwagi et al.

[11] Patent Number: 5,129,044
[45] Date of Patent: Jul. 7, 1992

[54] POSITION/FORCE CONTROLLING APPARATUS FOR WORKING MACHINE WITH MULTIPLE OF DEGREES OF FREEDOM

[75] Inventors: Kunio Kashiwagi, Tsuchiura; Toru Kurenuma, Ibaraki; Shinsaku Tsutsui, Ibaraki; Kazuyoshi Yamada, Ibaraki, all of Japan

[73] Assignee: Hitachi Construction Machinery Co., Ltd., Tokyo, Japan

[21] Appl. No.: 316,696

[22] Filed: Feb. 28, 1989

[30] Foreign Application Priority Data

Mar. 1, 1988 [JP] Japan .................. 63-48486
Mar. 1, 1988 [JP] Japan .................. 63-48487
Aug. 8, 1988 [JP] Japan .................. 63-197717

[51] Int. Cl.⁵ ............................................. G06F 15/50
[52] U.S. Cl. ........................................ 395/86; 395/95; 901/9; 901/15
[58] Field of Search .......... 364/513; 901/9, 14, 901/15; 395/86, 95

[56] References Cited

U.S. PATENT DOCUMENTS

| | | | |
|---|---|---|---|
| 4,547,858 | 10/1985 | Horak et al. | 364/513 |
| 4,580,229 | 4/1986 | Koyama et al. | 364/513 |
| 4,621,332 | 11/1986 | Sugimoto et al. | 364/513 |
| 4,826,392 | 5/1989 | Hayati | 364/513 |
| 4,860,215 | 8/1989 | Seraji | 364/513 |

FOREIGN PATENT DOCUMENTS 60-3010 1/1985 Japan .
61-7905 1/1986 Japan .

OTHER PUBLICATIONS

"Papers of Society of Measuring and Automatic Control Engineering", vol. 22, No. 3, 1986, pp. 343-350.

Primary Examiner—Allen R. MacDonald
Attorney, Agent, or Firm—Fay, Sharpe, Beall, Fagan, Minnich & McKee

[57] ABSTRACT

The position/force of a machine tool or robot end effecter having at least two degrees of freedom of movement is controlled. A first setting device sets the position command and/or posture command of the working tool on a machine. The instant position and/or posture of the working tool is detected. The force command and/or moment command for commanding the force and/or moment to be applied to the working tool is set, and the instant force and/or moment acting on the working tool is detected. A computing device determines from the position command and/or posture command and the instant position and/or posture, the position and/or posture offset in terms of the coordinate values of an operation coordinate system. A second computing device determines from the force command and/or moment command and the instant force and/or instant moment, force and/or moment offset in terms of the coordinate values of the operation coordinate system. Position/force computation for the control of the position of and the force on the working tool is computed from the position and/or posture offset and the force and/or moment offset in terms of the coordinate values of the operation coordinate system, thereby determining the amount of control to be effected on the working machine.

22 Claims, 22 Drawing Sheets

POSITION/FORCE CONTROLLING APPARATUS FOR WORKING MACHINE WITH MULTIPLE OF DEGREES OF FREEDOM

BACKGROUND OF THE INVENTION

The present invention relates to a force and position controlling apparatus for a multiple-degree-of-freedom working machine, such as an industrial robot, a machine tool, or the like having at least two degrees of freedom of position. More particularly, the present invention is concerned with a position/force controlling apparatus for controlling a multiple-degree-of-freedom working machine such as an industrial robot, a machine tool or the like capable of performing curved surface profiling operations such as deburring, polishing, and so forth.

Most current industrial robots and automatic machine tools are designed to operate only in position control in which the position of a specific portion of the robot or the tool is controlled in accordance with position information. On the other hand, there are operations which require the control of the manner in which force is applied. Such a control essentially requires that both the position and the force be controlled, and various studies have been made to develop systems which will meet such a demand. A typical example of such systems known as "hybrid control method" is capable of operating both in a position control and a force control mode while conducting change-over between these two modes for each of the coordinate axes. In another control method referred to as "compliance control method", control is executed by setting a certain "spring" relation between position and force.

In recent years, a system referred to as "virtual compliance control method" has been proposed as disclosed, for example, in "Papers of Society of Measuring and Automatic Control Engineering", vol 22, No. 3 (1986) pp 343-350, and Japanese Patent Unexamined Publication Nos. 60-3010 and 61-7905. This control method is to imaginarily realize a dynamic system model composed of a spring factor, a mass factor and a damper factor.

More specifically, this system relies upon the following formula of dynamic system:

$$m\ddot{X} + c\dot{X} + k\Delta X = f$$

In operation, suitable values are set as the values of m, c and k and the operation is simulated by software, and the control is effected such as to realize the movement. In order to execute this control on a system having multiple degrees of freedom, values for the factors m, c and k can be varied for each axis of a coordinate system, so that the operation characteristic can be determined independently for each of the coordinate axes. If the factor K is set as being 0 (zero), position feedback function is eliminated so that the control is effected only in the force control mode. Conversely, increase in the values of the factors k and c reduces the force feedback so that the control is performed only in position control mode. It will be seen that this method utilizes the hybrid control method. Thus, the virtual compliance control method is a control method which is a combination of the hy-brid control method and the compliance control method.

Unfortunately, however, no specific consideration has been given to the method of setting a coordinate system for the control computation in known systems which make use of the virtual compliance control method, with the result that the desired accuracy and efficiency of the operation are not attained depending on the type of the operation.

For instance, such problems are encountered by an industrial robot which is designed to be controlled both in a position control mode and a force control mode for conducting a curved surface profiling operation for the purpose of polishing or deburring of a curved surface. In such a case, the end effector of the robot is controlled to move along the work surface, i.e., to profile the work surface. The levels of force and moment applied to the end effector are detected by a force sensor. The case is considered whether the curved surface profiling operation is performed by making use of a virtual compliance control method. It is assumed here that the end effector is moved in X-axis direction, while the axis of the end effector extends in Z-axis direction. The operation will be explained on the basis of a two-dimensional plane defined by X-Z axes. For instance, the values of the factors k and c are increased in the X-axis direction to stiffen the system whereby the end effector is controlled in the position control mode so as to be fed at a velocity of VX, while the value of the factor k is set to 0 (zero) in the Z-axis direction to remove restriction of position, whereby the end effector is controlled in the force control mode so as to be pressed at a command force fr. The force level detected by the sensor in this state is represented by f.

In this case, the end effector moves in the Z-axis direction in such a manner as to simulate the following formula:

$$m\ddot{v}z + cvz = f - fr$$

In the steady condition in which there is no change in the velocity, a condition of $cvz = f - fr$ is met. It is understood that a force error $\Delta f = f - fr$ has to be given in order to generate the velocity vz at which the end effector profiles a curved surface. If the velocity vx of feed in the X-axis direction is constant, the velocity vz changes in proportion to the gradient of the curved surface, so that the force error $\Delta f$ also varies in proportion to the gradient of the curved surface. In consequence, the pressing force $-f$ varies according to the gradient of the curved surface. Representing the force error allowed in the profiling operation by $\Delta of$, the gradient which can be followed in steady condition is derived from the following condition:

$$\frac{1}{c} \cdot \frac{\Delta f0}{vx}$$

An increase in the factor 1/c increases the upper limit of the gradient of curved surface which can be followed up by the end effector. The factor 1/c, however, is a gain of the velocity to the force, i.e., the condition of $v = 1/c \, f$ is met, so that an increase in this factor causes hunting of operation in the control system. From this point of view, it is necessary that the factor 1/c takes a small value. This means that the feed velocity vx has to be decreased for a curved surface of a large gradient, resulting in an impractically low efficiency of operation.

Thus, a practical limit exists in controlling an end effector in such a way as to profile any desired curved surface, with the conventional method of setting the coordinate system.

In another known method, the profile of a curved surface is described in terms of command values, and the values of the factors k and c are so determined as to provide a virtual spring which absorbs error in the description (teaching), error attributable to wear of tool and the error due to dimensional fluctuation of the operation. In such a case, it is necessary that a virtual spring be provided to act not only in the Z-axis direction but also in the X-axis direction, in order to absorb the abovementioned errors on the curved surface. In this method, therefore, a certain influence of the spring is caused in the direction of feed, with the result that the error between the command position and the actual position is increased to hamper the operation. In particular, in the region where the curvature of the surface varies largely, the direction of feed is changed while the error of the position is large, so that troubles such as excessive cutting tend to occur.

Accordingly, an object of the present invention is to provide a position/force control apparatus for use with a multiple-degree-of-freedom working machine improved in such a way as to allow the setting of any desired coordinate system so as to attain adequate and efficient operations, thereby overcoming the above-described problems of the prior art.

SUMMARY OF THE INVENTION

To this end, according to the present invention, there is provided a position/force control apparatus for use with a multiple-degree-of-freedom working machine such as a robot, a machine tool or the like having at least two degrees of freedom of position, comprising: first setting means for setting a position and/or posture command for commanding a position and/or posture of a working tool on the machine; first detection means for detecting an instant position and/or posture of the working tool; second setting means for setting a force and/or moment command for commanding a force and/or moment to be applied to the working tool; second detection means for detecting an instant force and/or moment acting on the working tool; first computing means for determining, from the position and/or posture command set by the first setting means and the instant position and/or posture detected by the first detection means, a position and/or posture error converted into coordinate values of an arbitrary coordinate system; second computing means for determining, from the force and/or moment command set by the second setting means and the instant force and/or moment detected by the second detection means, a force and/or moment error converted into coordinate values of the arbitrary coordinate system; third computing means for executing computation for position and force control of the working tool by making use of the position and/or posture error in terms of the coordinate values of the arbitrary coordinate system obtained by the first computing means and the force and/or moment error in terms of the coordinate values of the arbitrary coordinate system obtained by the second computing means, thereby determining an amount of control to be effected on the working machine; and fourth computing means for converting the control amount in terms of the coordinate values of the arbitrary coordinate system determined by the third computing means into an operation command for a system for driving the working machine.

In the apparatus of the described invention, since the third computing means conducts position/force control computation by making use of the position/posture error and force/moment error in terms of the coordinate values of the arbitrary coordinate system to determine the amount of control to be effected on the working machine, the operation of the working machine is controlled on the basis of the control amount expressed in terms of the coordinate values of the arbitrary coordinate system. By setting an optimum arbitrary coordinate system according to the content of the operation to be performed, it is possible to conduct the required work adequately with a high degree of efficiency.

When a curved surface profiling operation is to be conducted, for example, a work surface coordinate system, which has its origin set on the end of the working tool contacting the work surface and includes coordinate axes of the same directions as the lines normal and tangential to the work surface, is used as the arbitrary coordinate system, and the normal line direction is set as a z-axis and the tangential direction, i.e., the direction of movement is set as an x-axis. When the third computing means is designed to conduct a virtual compliance control such as to effect the position control in the x-axis direction while conducting the force control in the z-axis direction, the gradient of the curved work surface is reduced to a small value which corresponds only to small error incurred during the setting of the coordinate system, so that the force error in the z-axis direction is made sufficiently small to permit the moving speed in the x-axis direction, i.e., the feed velocity vx to be increased significantly. The above-mentioned small error can be absorbed by a virtual spring set in the system. In this case, since the x-axis direction is tangential to the work surface, no restraint is effected in this direction so that it is not necessary to employ the virtual spring which would act in this direction. Thus, the feed can be effected by ordinary position control without causing any undesirable increase in the position error in the direction of the feed.

In one aspect of the invention, the first computing means may include first means for determining a position and/or posture error between the position and/or posture command set by the first setting means and the instant position and/or posture detected by the first detection means, and second means for converting the position and/or posture error determined by the first means into the coordinate values of the arbitrary coordinate system, while the second computing means may include third means for converting the instant force and/or moment detected by said second detection means into coordinate values of the arbitrary coordinate system, and fourth means for determining the force and/or moment error between the instant force and/or moment converted into the coordinate values of the spontaneous coordinate system by the third means and the force and/or moment command in terms of the coordinate values of the arbitrary coordinate system set by the second setting means.

In this case, it is preferable that the first computing means further includes fifth means for converting the instant position and/or posture detected by the first detection means into coordinate values of a base coordinate system fixed to a space in which the working machine is situated, before determining the position and/or posture error by the first means, that the second computing means further includes sixth means for converting the instant force and/or moment detected by the second detection means into coordinate values of a reference coordinate system which have three orthogonal coordinate axes of the same directions as the base coordinate system and having the same origin as that of a hand coordinate system fixed to the working tool, before converting the same into the coordinate values of the arbitrary coordinate system by the third means, and that the fourth computing means includes seventh means for converting the control amount determined by the third computing means into coordinate values of the base coordinate system and eighth means for converting the control amount in terms of the coordinate values of the base coordinate system into the operation command for the system for driving the working machine.

By effecting a conversion to and from the arbitrary coordinate system via the base coordinate system, it is possible to describe the coordinate conversion in terms of the rotation from the base coordinate system. This conversion is executed easily because the base coordinate system is always computed.

In a different aspect of the invention, the first computing means may include ninth means for converting the instant position and/or posture detected by the first detection means into coordinate values of the arbitrary coordinate system, and tenth means for determining the position and/or posture error between the instant position and/or posture in terms of the coordinate values of the arbitrary coordinate system obtained by the ninth means and the position and/or posture command set by the first setting means, while the second computing means may include eleventh means for converting the instant force and/or posture detected by the second detection means into coordinate values of the arbitrary coordinate system, and twelfth means for determining force and/or moment error between the instant force and/or moment converted into the coordinate values of the arbitrary coordinate system by the eleventh means and the force and/or moment command in terms of the coordinate values of the arbitrary coordinate system set by the second setting means.

In this case, for the same reason as that explained before, it is also preferable that the first computing means further includes thirteenth means for converting the instant position and/or posture detected by the first detection means into coordinate values of a base coordinate system fixed to a space in which the working machine is situated, before converting the same by the ninth means into the coordinate values of the arbitrary coordinate system, that the second computing means further includes fourteenth means for converting the instant force and/or moment detected by the second detection means into coordinate values of a reference coordinate system which have three orthogonal coordinate axes of the same directions as the base coordinate system and having the same origin as that of a hand coordinate system fixed to the working tool, before converting the same into the coordinate values of the arbitrary coordinate system by the eleventh means, and that the fourth computing means includes fifteenth means for converting the control amount determined by the third computing means into the coordinate values of the base coordinate system and sixteenth means for converting the control amount in terms of the coordinate values of the base coordinate system into the operation command for the system for driving the working machine. In another aspect of the invention, the apparatus may further comprise: fifth computing means for computing a vector $v$ of a direction of movement of the working tool from the instant position detected by the first detection means; sixth computing means for computing a vector $f$ of a reactional force received by the working tool from the instant force detected by the second detection means; and seventh computing means for computing orthogonal unit vectors $i$, $j$ and $k$ from the reactional force vector $f$ computed by the sixth computing means and the moving direction vector $v$ computed by the fifth computing means; wherein the first, second or fourth computing means executes, by making use of the unit vectors $i$, $j$ and $k$ computed by the seventh means, the coordinate conversion by using the cartesian coordinate system $(i, j, k)$ formed by the unit vectors as the arbitrary coordinate system.

According to this arrangement, the arbitrary coordinate system can be automatically computed and given upon conducting the position and force control. Therefore, when the work surface coordinate system is used as the arbitrary coordinate system, it is possible to easily set the work surface coordinate system even if the work surface has such a complicated curved configuration that would never be described by manual work. In addition, this arrangement enables on-line generation of the coordinate system which is essentially required in automatic profiling machining.

In a specific form of this aspect, the seventh computing means may compute the unit vector $k$ from the reactional force vector $f$ computed by the sixth computing means, and compute, from the unit vector $k$ and the moving direction vector $v$ computed by the fifth computing means, the unit vector $j$ as a unit vector orthogonal both to the unit vectors $k$ and $v$ and the unit vector $i$ as a unit vector orthogonal to the unit vector $k$ and contained in the plane defined by the unit vectors $k$ and $v$.

With this arrangement, it is possible to easily determine the unit vectors $i$, $j$ and $k$ by computing the unit vector $k$ by the seventh computing means from the reactional force vector $f$ computed by the sixth computing means. The unit vectors of the work surface coordinate system can be determined by computing a normal direction vector $n$ in the direction normal to the work surface from the reactional force vector $f$ determined by the sixth computing means and then computing the unit vector $k$ from the normal direction vector $n$ as a unit $f$ vector thereof.

In another specific form of this aspect, the seventh computing means may compute the unit vector $i$ from the moving direction vector $v$ computed by the fifth computing means as a unit vector of the direction of movement of the working tool, and compute, from the unit vector $i$ and the reactional force vector $f$ computed by the first computing means, the unit vector $j$ as a unit vector orthogonal to the vectors $i$ and $f$ and the unit vector $k$ as a unit vector orthogonal to the unit vector $i$ and contained in the plane defined by the unit vectors $i$ and $f$.

With this arrangement, the seventh computing means computes the unit vector $i$ of the direction of movement of the working tool from the moving direction vector $v$ computed by the fifth computing means. Namely, the unit vector in the normal direction is not directly determined from the reactional force data. Therefore, the unit vectors $i$, $j$ and $k$ of the work surface coordinate system can be determined precisely without being affected by any offset of the direction of the reactional force from the normal direction due to, for example, friction.

The apparatus of the invention may further comprise memory means for storing the unit vectors $i$, $j$ and $k$ computed by the seventh computing means, together with other teaching data; and play-back means for outputting the stored data during play-back operation.

This enables the work surface coordinate system to be given as teaching data with which the operation of the multiple-degree-of-freedom working machine can be controlled easily. This arrangement also enables the apparatus to be used for other purposes such as shape recognition.

In still another aspect of the invention, the apparatus may further comprise: third setting means for presetting a plane which intersects the work surface; eighth computing means for computing a vector f of a reactional force received by the working tool, from the instant force detected by the second detection means; ninth computing means for computing a normal direction vector n of the direction normal to the work surface from at least the reactional force vector f computed by the eighth computing means; and tenth computing means for computing, from the normal direction vector n computed by the ninth computing means, a unit vector k of the normal direction vector, and computing, from the normal direction vector n and the plane pre-set by the third setting means, a unit vector i in the direction of line of intersection between a tangential plane of the work surface and the pre-set plane, and computing a unit vector j orthogonal both to the unit vectors k and i; and the first and second or fourth computing means may execute, by making use of the unit vectors i, j and k computed by the tenth means, said coordinate conversion by using the cartesian coordinate system (i, j, k) formed by the unit vectors as the arbitrary coordinate system.

By setting the unit vector i of one of the coordinate axes on the pre-set plane, it is possible to set the moving direction in parallel with the set plane, whereby the error is reduced in the direction of movement.

In a specific form of this aspect, the apparatus may further comprise eleventh computing means for computing a vector v of a direction of movement of the working tool from the instant position detected by the first detection means; and the ninth computing means may compute a vector P orthogonal both to the reactional force vector f computed by the eighth computing means and the moving direction vector v computed by the eleventh computing means, and compute as the normal direction vector n normal to the work surface a unit vector orthogonal both to the moving direction vector v and the vector P.

The frictional force generated between the working tool and the work surface acts in the direction opposite to the moving direction v, and therefore the reactional force f is inclined in the direction of action of the frictional force. The reactional force, however, is in the plane which is defined by the normal linen to the work surface and the moving direction v. In addition, the moving direction v coincides with the direction tangential to the work surface. It is therefore possible to determine the normal direction vector n without influence of frictional force and hence to accurately compute the work surface coordinate system by virtue of the ninth computing means for computing the direction orthogonal to the moving direction vector v within the plane defined by the reactional force vector f and the moving direction vector v.

In yet another aspect of the invention, the apparatus may be constructed such that the arbitrary coordinate system is a work surface coordinate system having its origin on end of the working tool contacting the work surface and having three orthogonal axes one of which is directed in the direction of the normal to the work surface, the first setting means includes two-dimensional input means for setting a direction of movement of the working tool, the second setting means includes force setting means for setting a level of the force to be applied to the working tool, and the third computing means conducts a computation for indicating the level of the force set by the force setting means for one of the three orthogonal axes of the work surface coordinate system, while conducting a computation for indicating the direction of movement set by the two-dimensional setting means on the remainder two of the three orthogonal axes.

In this arrangement, since the third computing means conducts a computation for indicating the level of the force set by the force setting means for one of the three orthogonal axes of the work surface coordinate system, while conducting a computation for indicating the direction and magnitude of movement set by the two-dimensional setting means on the remainder two of the three orthogonal axes, the operator can enable the working tool to move along the curved work surface merely by manual operating the two-dimensional input means, once the force is set at a desired level by the force setting means.

In addition, since the control is performed on the work surface coordinate system, it is possible to restrict the direction of movement of the working tool only to the plane tangential to the curved surface. Since the moving direction varies along the curved surface, the operator can easily grasp the moving distance and velocity as a matter of sense.

DESCRIPTION OF THE PREFERRED EMBODIMENTS

Figure 1:
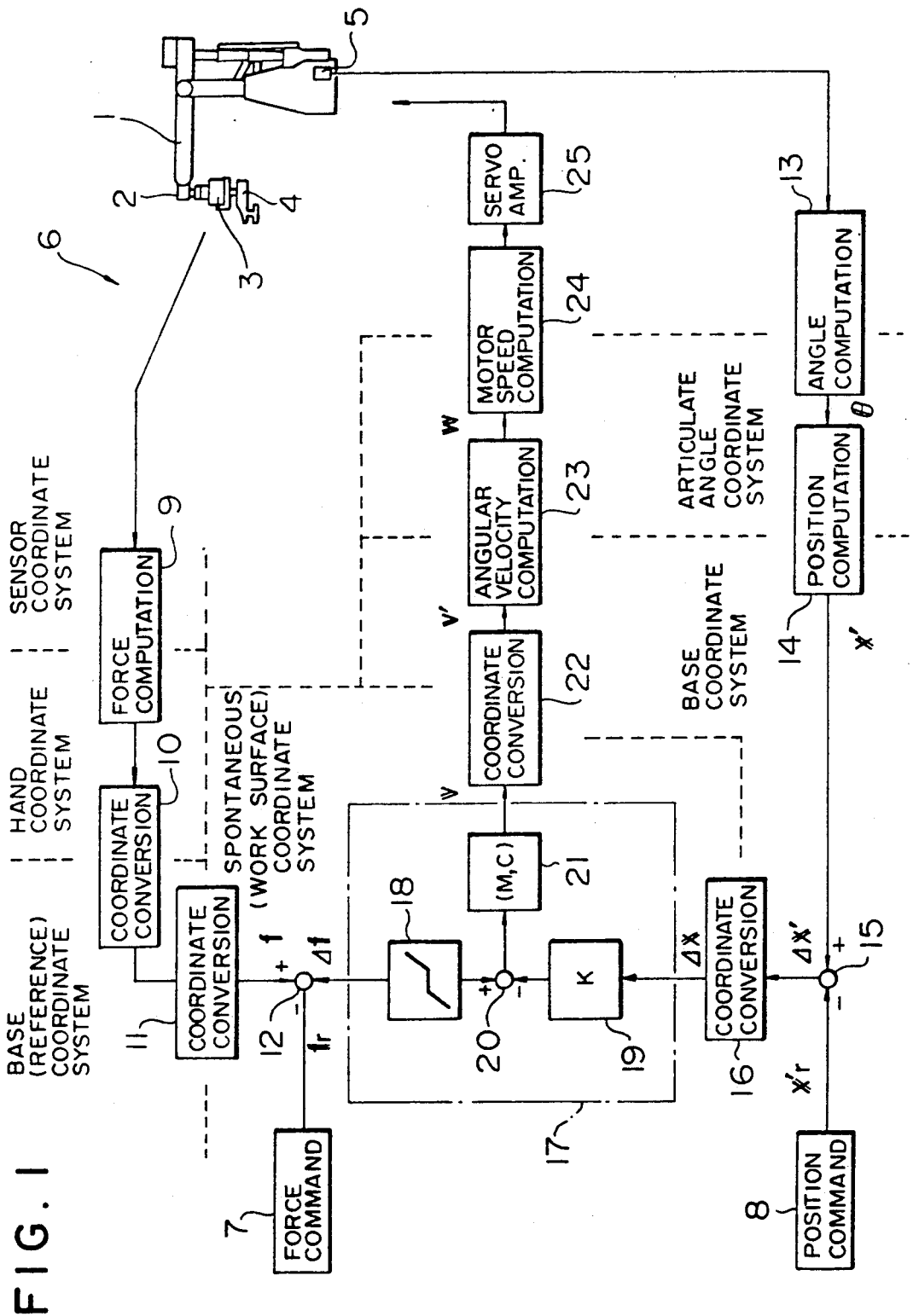
FIG. 1 s a block diagram of a first embodiment of the position/force control system in accordance with the present invention.

Preferred embodiments of the present invention will be described with reference to the accompanying drawings.

Note that whereas the drawings show vectors represented by the letter with a double stroke, the specification represents the vectors by underlining the letter, e.g., an "f" shown in the drawings is equivalent to an "$\underline{f}$" appearing in the specification.

First Embodiment

FIG. 1 illustrates the entire portion of a first embodiment of the position/force control apparatus in accordance with the present invention. An articulated industrial robot 1 has a hand 2 to which is secured an end effector 4 for operating on a workpiece with a tool, grip or the like. A sensor 3 is disposed between the hand 2 and the end effector 4 for detecting force and moment (referred to as "force/moment" hereinafter) acting on the end effector 4. The robot 1 also has driving motors (not shown) capable of effecting driving around the respective joints, so that the position and posture (referred to as "position/posture" hereinafter) of the end effector 4 is controlled by controlling these driving motors. An angle sensor such as an encoder denoted by a numeral 5 is provided on each driving motor so that the amount of driving of each driving motor, i.e., the angle data of each joint, is detected by the encoder 5.

The control apparatus for controlling the robot 1, generally denoted by 6, comprises the force sensor 3 and the angle sensor 5. The control apparatus 6 also has a force command setting section 7 for setting a command $\underline{f}r$ for the force/moment applied to the end effector 4, and a position command setting section 8 for setting a command $\underline{x}'r$ for the position for the posture of the end effector 4. The force command setting section 7 is capable of setting the force/moment command as coordinate values of a later-mentioned arbitrary coordinate system, while the position command setting section 8 is capable of setting the position/posture command as coordinate values of a later-mentioned base coordinate system. The force command setting section 7 is capable of using, for example, teaching data, while the position command setting section 8 is capable of using, for example, values obtained through interpolation of the teaching data.

The force and moment is detected by the force sensor 3 is sent to a force computing section 9 which conducts conversion from a sensor coordinate system into a hand coordinate system, while effecting gravity compensation by subtracting the force corresponding to the weight of the end effector 4.

The force/moment expressed by the hand coordinate system are converted by a coordinate conversion section 10 into coordinate values of a later-mentioned reference coordinate system which makes use of a base coordinate system. The conversion into the reference coordinate system is effected only for the direction component (rotational conversion).

The force/moment expressed in terms of the coordinate values of the reference coordinate system are then converted into coordinate values of an arbitrary coordinate system in a coordinate conversion section 11. The force/moment after the conversion are expressed in a vector $\underline{f}$. This conversion also is a rotational conversion which consists solely of the conversion of direction.

The force/moment $\underline{f}$ after conversion by the coordinate conversion section 11 is compared by a force error computing section 12 with the command $\underline{f}r$ of the force/moment set by the force command setting section 7, so that an error $\Delta \underline{f}$ is determined, namely, computation $\Delta \underline{f} = \underline{f} - \underline{f}r$ is executed.

On the other hand, axis angle data from the encoder 5 connected to the motors of the robot 1 are delivered to an angle computing section 13 which computes the angle $\theta f$ of each joint. The computed joint angles $\theta$ then delivered to a position computing section 14 which determines the position/posture $\underline{x}'$ of the hand 2 on the base coordinate system.

The position/posture $\underline{x}'$ computed by the position computing section 14 is compared by a position error computing section 15 with the position/posture command $\underline{x}'r$ set by the position command setting section 8, so that an error is determined. The position/posture error $\Delta \underline{x}'$ as expressed in terms of the base coordinate system is converted by a coordinate conversion section 16 into coordinate values of the arbitrary coordinate system, so that an error $\Delta x$ is determined. This conversion is a rotational conversion consisting solely of conversion of direction executed by means of the same conversion matrix as in the case of the conversion performed by the coordinate conversion section 11.

The force/moment error $\Delta f$ on the arbitrary coordinate system computed by the force error computing section 12 and the position/posture error $\Delta \underline{x}$ on the arbitrary coordinate system computed by the coordinate conversion section 16 are input to a position/force control computing section 17. The position/force control computing section 17 executes control computation of position and force on the arbitrary coordinate system using the errors $\Delta f$ and $\Delta \underline{x}$, thereby determining a velocity command $\underline{v}$ on this coordinate system. In this embodiment, the position/force control computing section 17 employs a control computation based on the virtual compliance control.

The position/force control computing section 17 is practically composed of a dead zone computing section 18, a spring constant multiplication section 19, a subtraction section 20, and a characteristic compensation computing section 21.

The dead zone computing section 18 computes a value $\Delta f$, by setting a dead zone on the force error $\Delta f$ computed by the force error computing section 12. The setting of the dead zone may be effected in such a manner as to eliminate any influence of minute force such as those produced by noises or disturbance. The width of the dead zone may be set freely on the respective coordinate axes. Thus, the dead zone width may be zero or, alternatively, increased so as to maintain the level of the output $\Delta f$ always at zero. In the latter case, feedback of the force component is reduced to zero so that the position control is executed solely. The spring constant multiplication section 19 multiplies the position error $\Delta x$ with a virtual spring constant matrix K set for each coordinate axis, thereby determining $Kx$. The matrix K is a diagonal matrix having components Ki which are virtual spring constants which are freely set on the respective coordinate axes. If the components Ki are set zero, feed back of the position component is eliminated so that the force control is executed solely.

The subtracting section 20 subtracts the value $K \Delta \underline{x}0$ produced by multiplying the position error $\Delta \underline{x}$ with the virtual spring constant matrix K from the value $\Delta f$ produced as a result of the dead zone computation on the force error $\iota f$.

The characteristic compensation computing section 21 effects a characteristic compensating computation on the output $\Delta f - K \Delta \underline{x}$ of the subtracting section 21, thereby determining the velocity command $\underline{v}$. In the virtual compliance control, the velocity command is computed by employing a virtual mass matrix M and a virtual viscosity coefficient matrix C, such that the robot hand moves to follow the condition of the following formula (1).

$$M\underline{\dot{v}} + C\underline{v} = \Delta f = K\Delta \underline{x} : .. \qquad (1)$$

The velocity command $\underline{v}$ computed by a position/force control computing section 17 is expressed in terms of coordinate values of the arbitrary coordinate system. These values are converted by a coordinate conversion section 22 into velocity $\underline{v}'$ in terms of the base coordinate system. The velocity command $\underline{v}'$ of the base coordinate system is input to an angular velocity computing section 23 which computes angular velocity command $\underline{w}$ for each joint. The angular velocity command $\underline{w}$ is input to a motor speed computing section 24 which computes a speed command for each driving motor. The thus computed motor speed command is input to a servo amplifier 25 which operates to control each driving motor of the robot 1 in accordance with the motor speed command. During the control, motor speed is fed back through the tachogenerator connected to the motor.

The operation of the control apparatus having the described construction will be explained in detail on an assumption that the apparatus is used on a multi-articulated robot 1 having 6 (six) degrees of freedom.

When the robot 1 is made to conduct a curved surface profiling operation for the purpose of, for example, surface polishing or deburring, the end effector 4 attached to the robot 1 receives force/moment as a result of reaction. The force/moment is detected by the force sensor 3, as coordinate values of a sensor coordinate system which has an origin at the center of deformation of the sensor. These coordinate values are then converted by the force computing section 9 into coordinate values of a hand coordinate system which has an origin at a suitable portion on the end effector and which is fixed to the end effector so as to move together with the end effector. The origin of this coordinate system is usually set at a point near the force application point where the force is applied. The conversion from the sensor coordinate system to the hand coordinate system is conducted by means of a constant matrix. The force computing section 9 also executes subtraction of a gravity component corresponding to the force of gravity acting on the end effector 4, thereby eliminating any influence of the weight of the end effector 4 which varies depending on the posture of the hand.

The force/moment after conversion into coordinate values of the hand coordinate system are then converted into coordinate values of an arbitrary coordinate system by means of the coordinate conversion sections 10 and 11. The arbitrary coordinate system has an origin which is set on the same point as the hand coordinate system and the directions of the coordinate axes of this coordinate system can be set arbitrarily. When a profiling operation is to be executed, the coordinate axes are preferably set in the directions of lines which are normal and tangential to the work surface. From a view point of easiness of the computation, therefore, the conversion into the arbitrary coordinate system is preferably described in the form of rotation from a reference coordinate system which is fixed in the same space as the work. The reference coordinate system can be determined by making use of the base coordinate system which is fixed in a space in which the robot is situated. More specifically, a coordinate system whose three orthogonal axes are directed in the same directions as the base coordinate system and which has the same position of origin as the hand coordinate system is determined as the reference coordinate system, and the conversion into the arbitrary coordinate system is described as a rotational conversion from the reference coordinate system (base coordinate system). This rotational conversion is performed by the coordinate conversion section 11. This coordinate conversion necessitates a conversion from the hand coordinate system to the reference coordinate system. This conversion is executed by the coordinate conversion section 10. Thus, the coordinate conversion section 10 operates to convert only the directions into the base coordinate system. This coordinate-conversion is given by the orientation of the hand coordinate system with respect to the base coordinate system, as is the case of a later-mentioned matrix which represents the posture of the hand. The orientation, therefore, is always computed so that the conversion is effected without difficulty.

The force $\underline{f}$ on the arbitrary coordinate thus computed is compared with a force command $\underline{fr}$ which is set by the force command setting section 7, whereby the force error $\Delta \underline{f}$ is computed by the force error computing section 12.

In regard to the position/posture, each joint angle $\theta$ is computed by the angle computing section 13 on the basis of the value output from the encoder connected to each motor of the robot 1. Using the joint angle $\theta$ thus computed, the position computing section 14 computes the position/posture $\underline{x}'$ of the hand in terms of the coordinate values of the base coordinate system. The position/posture $\underline{x}'$ of the hand on the base coordinate system is viewed on the basis of the position of the origin and the directions of the coordinate axes of the hand coordinate system. FIG. 1 shows the position/posture on the base coordinate system in terms of a six-dimensional vector $\underline{x}'$. The three-dimensional vector in the six-dimensional vector representing the posture is a vector which represents the angle of rotation of the hand coordinate system with respect to the base coordinate system, i.e., a vector the direction of which represents the direction of rotation of the hand coordinate system with respect to the base coordinate system and the value or size of which represents the angle of rotation of the hand coordinate system.

In the actual computation, the posture is not represented in the above-described manner but is expressed in terms of 3×3 matrix (ih, jh and kh) composed of unit vectors in the directions of the respective coordinate axes of the hand coordinate system expressed in terms of the coordinate values of the base coordinate system.

The position/posture computed by the position computing section 14 is compared with the position/posture command $\underline{x}'r$ which is set by the position command setting section 8 and the position/posture error $\Delta \underline{x}'$ is computed by the position error computing section 15. The posture error can be expressed by a vector which represents the angle of rotation between the command posture and the actual posture. Representing the matrix of the command hand coordinate system by (ihr, jhr, khr), the posture offset is given by $\psi \underline{e}$, where $\psi \underline{e}$ represents the unit vector of the axis of rotation, while $\psi$ is a rotation angle about the axis. $\underline{e}$ and $\psi$ can be expressed as follows, respectively:

$$\underline{e} = \frac{(ih - ihr) \times (jh - jhr)}{(ih - ihr) \times (jh - jhr)}$$

$$\psi = \frac{\underline{e} \cdot (ih \times ihr)}{ih \cdot ihr - 2(\underline{e} \cdot jh) + 1}$$

The position/posture error $\Delta \underline{x}'$ thus determined is expressed in terms of the coordinate values of the base coordinate system. These coordinate values are then converted by the coordinate conversion section I into the arbitrary coordinate system such as a later-mentioned work surface coordinate system. This conversion is a rotational conversion as is the case of the conversion performed by the coordinate conversion section 11.

A control computation is executed by the position/force control computing section 17 by making use of the force error $\Delta \underline{f}$ and the position error $\Delta \underline{x}$ on the arbitrary coordinate system determined in the manner as described above. In this embodiment, this computation is executed as virtual compliance control by means of the elements 18 to 21 as explained before.

More specifically, in the dead zone computing section 18, dead zone is computed for each coordinate axis of the force error $\Delta \underline{f}$ so as to determine the force error $\Delta \underline{f}'$. The spring constant multiplication section 19 multiplies the position error $\Delta \underline{x}$ with the virtual spring constant matrix K set for each coordinate axis, thereby determining $K\Delta \underline{x}$. The subtracting section 20 subtracts the thus determined $K\Delta \underline{x}$ from the force error $\Delta \underline{f}$, obtained through the dead zone computation. The characteristic compensation computing section 21 effects a control characteristic compensating computation in the output $\Delta \underline{f}' - K\Delta \underline{x}$ of the subtracting section. Then, in the virtual compliance control, a velocity command is computed in accordance with a virtual mass matrix M and the virtual viscosity coefficient matrix C in such a manner that the hand moves to simulate the condition of the aforementioned formula (1).

This computation can be executed in the form of the following formula (2) which is obtained through transformation of the formula (1) into a discrete system:

$$\underline{v}n = \Delta t M^{-1}(\Delta e_,uns/f/ - k\Delta \underline{x}) + (I - \Delta t M^{-1}C)\underline{v}n - 1 \ldots \quad (2)$$

where, $\Delta t$ represents a sampling period, $\underline{v}n$ represents the n-th sampling cycle value, $\underline{v}$ represents a six-dimensional vector showing the translational movement speed and the rotation speed, $\Delta \underline{f}'$ represents a six-dimensional vector representing the force/moment error, $\Delta \underline{x}$ represents a six-dimensional vector representing the position/posture error, and M, C and K are 6×6 matrices. Diagonal matrices are used as the matrices M, C and K.

The parameters K, M and C of each element, as well as the width of the dead zone, are given on the arbitrary coordinate system, and the position/force control computation is executed on this arbitrary coordinate system.

The velocity command $\underline{v}$ computed by the position/force computing section 17 is a command for operating the robot 1. The velocity command $\underline{v}$ is expressed in terms of the coordinate values of the arbitrary coordinate system. These coordinate values are therefore converted by the coordinate conversion section 22 into the value $\underline{v}'$ on the base coordinate system and is then converted into angular velocity $\underline{w}$ of each joint of the robot by means of the angular velocity computing section 23. The angular velocity command $\underline{w}$ is then converted by the motor speed computing section 24 into the speed of each driving motor, so that the robot is controlled through the servo amplifier 25 so as to move in accordance with the velocity command.

A detailed description will be given of the rotational conversions performed by the coordinate conversion sections 11, 16 and 22. Unit vectors of the coordinate axes of the arbitrary coordinate system as viewed from the base coordinate system are expressed by $\underline{ia}$, $\underline{ja}$ and $\underline{ka}$. In this case, the three-dimensional vector $\underline{u}$ is expressed as $\underline{u}a$ on the arbitrary coordinate system as follows:

$$\underline{u}a = (\underline{i}a, \underline{j}a, \underline{k}a)^T \underline{u}$$

where, T represents a transposed matrix. Namely, the coordinate conversion matrix can be expressed as ($\underline{i}a$, $\underline{j}a$, ka)T in the case where the conversion is a mere rotational conversion which does not include any movement of the point of origin. The matrices used in the coordinate conversion sections 11 and 16 are 6×6 matrixes. This conversion is executed by using the following matrix for each of the translational movement and rotation:

$$\begin{pmatrix} (ia, ja, ka)^T & \theta \\ \theta & (ia, ja, ka)^T \end{pmatrix}$$

On the other hand, the coordinate conversion section 22 performs conversion from the arbitrary coordinate system into the base coordinate system, so that the above-mentioned formula is transformed into $$\underline{u} = [(ia, ja, \underline{k}a)^T]^{-1} =$$

and further into $$[(ia, ja, \underline{k}a)^T]^{-1} = (ia, ja, \underline{k}a)$$

Thus, the conversion matrix used in the coordinate conversion section 22 is given as follows:

$$\begin{pmatrix} (ia, ja, ka)^T & \theta \\ \theta & (ia, ja, ka)^T \end{pmatrix}$$

As will be understood from the foregoing description, the coordinate conversion performed by each of the coordinate conversion sections 11, 16 and 22 is given by unit vectors ia, ja and ka of the coordinate axes of the arbitrary coordinate system.

When the robot 1 is used for profiling operation, a work surface coordinate system 3 which has an origin on the end of the working tool and having axes coinciding with the directions of lines normal and tangential to the work surface is preferably used as the arbitrary coordinate system. In this case, unit vectors of the coordinate axes of the work surface coordinate system are used as the conversion matrix, and the values of the unit vectors are beforehand stored in the coordinate conversion sections 11, 16 and 22 along the curved surface to be followed by the hand.

The embodiment described hereinbefore offers the following advantage when used in a profiling operation.

Figure 2:
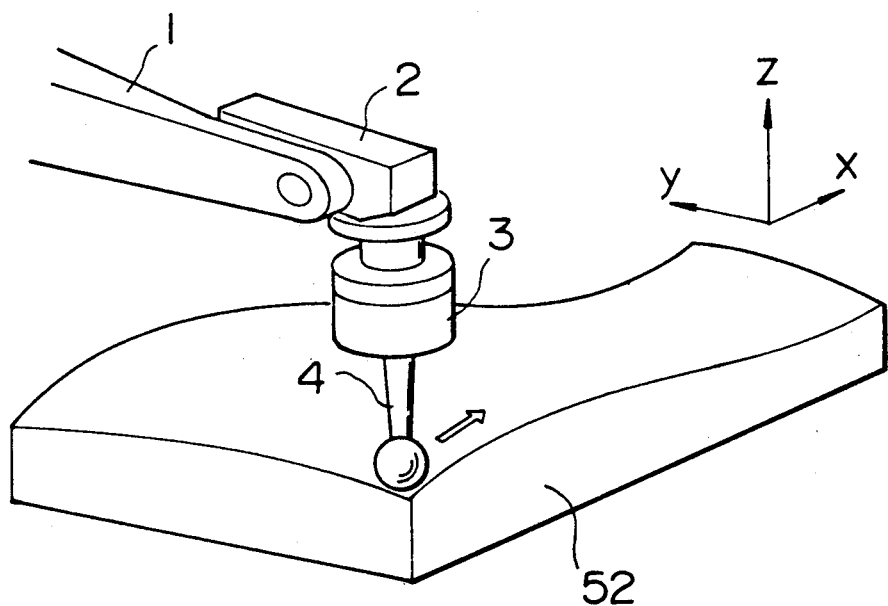
FIG. 2 is a schematic illustration showing a curved surface profiling operation of a robot.

FIG. 2 schematically illustrates the manner in which a curved surface profiling operation is being executed by the robot 1. The robot 1 is controlled such that the end effector 4 follows the work surface 52. The force/-moment acting on the end effector 4 is sensed by the force sensor 3.

Figure 3:
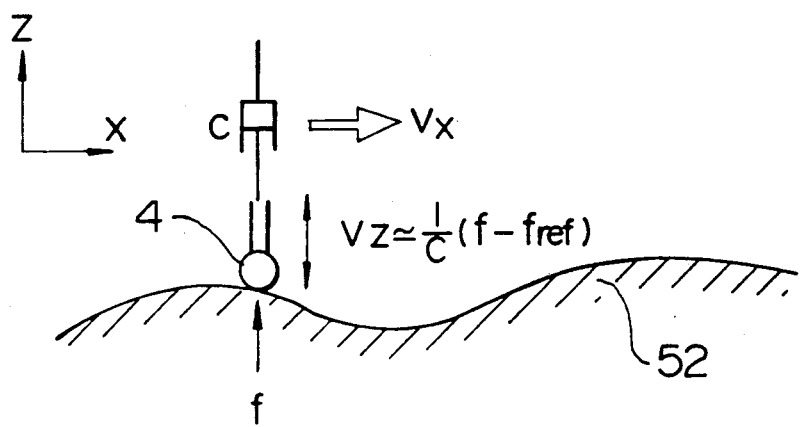
FIG. 3 is an illustration of a curved surface profiling operation in accordance with a conventional control method which relies upon a constant pressing force.

In a conventional control system, this type of profiling operation is executed, for example, in a manner shown in FIG. 3 by a virtual compliance control so as to simulate the following condition of dynamic system:

$$m\ddot{x} + c\dot{x} + K\Delta x = f$$

FIG. 3 shows the operation using the x-z plane for the purpose of simplification of explanation. In this method, values of K and C are increased in the X-axis direction so as to provide a greater stiffness in the X-axis direction, while the end effector 4 is fed at a velocity vx under the position control. The value K is set to be zero in the z-axis direction so as to dismiss any position restraint in the z-axis direction, and the end effector 4 is pressed against the work surface with the force command fr under the force control. Representing the force detected by the force sensor 3 by f, the end effector 4 moves in the z-axis direction in such a manner as to simulate the condition of:

$$m\dot{v}z + cvz = f - fr$$

In the steady condition in which there is no change in the velocity, the condition of $cvz = f - fr$ is met so that a force error $\Delta f = f - fr$ is required in order to generate the velocity vz necessary for the end effector 4 to follow the curved surface. Assuming here that the feed velocity vx in the direction of the x-axis is constant, the velocity vz varies in proportion to a change in the gradient of the curved surface. In consequence, the force error $\Delta f$ and, hence, the pressing force $-f$ are proportional to the gradient of the curved surface. Representing the force error allowed by the profiling operation by $\Delta fO$, the gradient of the curved surface which can be followed in the steady condition is given as follows:

$$\frac{1}{c} \cdot \frac{\Delta fO}{vx}$$

The followable gradient can be increased by increasing the factor 1/C but such a measure is not preferred because an increase in the factor 1/C, which is the gain of the velocity to the force $v = 1/C \cdot f$, causes a hunting in the control system. In order to obviate such inconvenience, it is not allowed to increase the value of the factor 1/C. In consequence, the curved surface of a large gradient is followed by the end effector only when the feed velocity vx has a very small value, with the result that the efficiency of the profiling operation is impractically hampered.

It will be seen that a practical limit exists when the profiling of a curved surface is effected by the method shown in FIG. 3.

Figure 4:
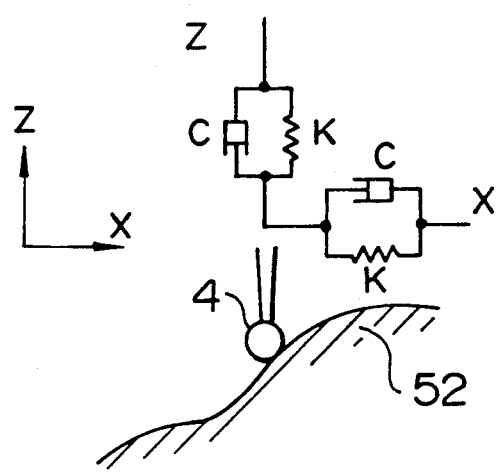
FIG. 4 is an illustration of a curved surface profiling operation in accordance with a conventional control method which makes use of a virtual spring.

FIG. 4 illustrates another method in which command values of the curved surface are described and the values of the factors K and C are determined such that error such as the description (teaching) error, error due to wear of the tool and fluctuation in the work size are absorbed by a virtual spring. In this case, it is necessary that the virtual spring is incorporated not only in the z-axis direction but also in the x-axis direction so that above-mentioned errors occurring on a curved surface are absorbed. In this case, therefore, the influence of the spring appears also in the direction of feed of the hand, so that the position error between the command position and the actual position is increased to hamper the operation. In particular, a defect such as excessive cutting tends to occur at the portion of the curved surface where the curvature varies largely, because the feeding direction is changed while the position error is large.

Figure 5:
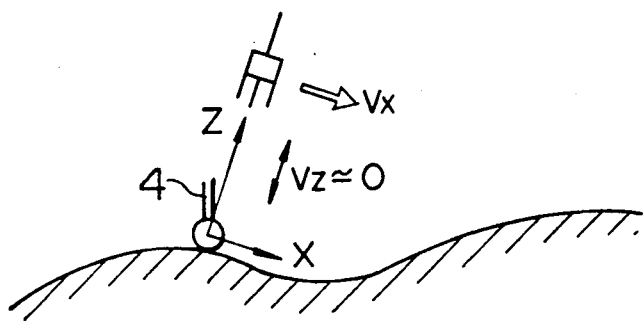
FIG. 5 is an illustration of a curved surface profiling operation performed by the control apparatus of FIG. 1 in a constant pressing force control mode.

In contrast to the conventional method explained in connection with FIG. 3, the described embodiment of the present invention makes use of the work surface coordinate system as the arbitrary coordinate system as shown in FIG. 5, so that the z-axis and the x-axis of the arbitrary coordinate system can always align with the directions of the lines normal and tangential to the work surface, respectively. Therefore, when the position control and the force control are performed in the x-axis direction and the z-axis direction, respectively, by the position/force control computing section 17, the error component of the gradient of the curved surface includes only the error incurred during setting of the coordinate. Thus, the profiling velocity vz is much smaller than that produced in the conventional method of FIG. 3 so that the force error can be decreased. It is therefore possible to increase the moving speed in the x-axis direction, i.e., the feed velocity vx, without being restricted by the gradient of the curved surface.

Figure 6:
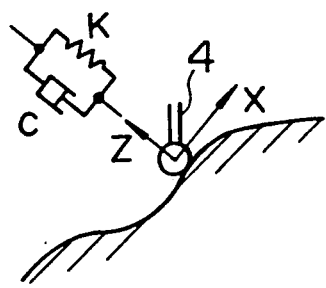
FIG. 6 is an illustration of a curved surface profiling operation performed by the control apparatus of FIG. 1 by means of a virtual spring.

FIG. 6 shows a method which incorporates a virtual spring so as to absorb the error in described embodiment as compared with the conventional method shown in FIG. 4. In this case, since the x-axis is aligned with the tangential line, the hand is not restrained in this direction so that it is not necessary to incorporate the virtual spring in the direction of the x-axis for the purpose of softening the virtual spring. It is therefore possible to feed the hand in the x-axis direction by the ordinary position control, so that any inconvenience attributable to an increase in the position error in the direction of feed can be eliminated.

As has been described, according to the present invention, the required operation can be performed adequately and efficiently by virtue of the fact that a specific consideration is given to the method of setting the coordinate system for the control computation.

Second Embodiment

Figure 7:
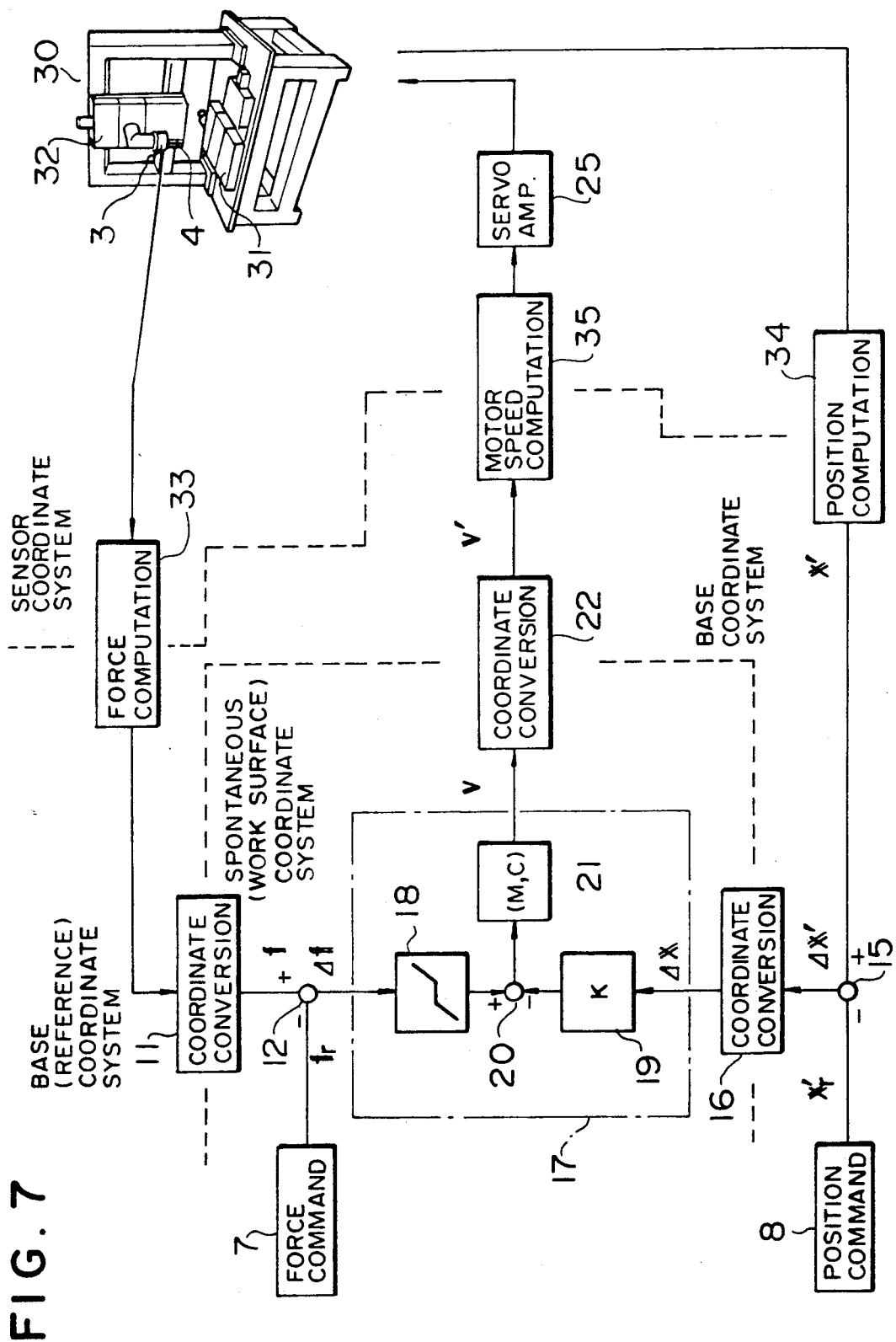
FIG. 7 is a block diagram of a second embodiment of the position/force control apparatus in accordance with the present invention.

A second embodiment of the present invention will be described with reference to FIG. 7. The first embodiment described before is applied to the control of a robot having 6 (six) degrees of freedom. The invention, however, is basically applicable to various working machines having two or more degrees of freedom. The embodiment shown in FIG. 7 is applied to a machine tool having three axes. In this Figure, the same reference numerals are used to denote the same parts or members as those appearing in FIG. 1.

Referring to FIG. 7, a machine tool denoted by 30 is provided with an x-y table 31 and a z-axis driving mechanism 32. The x-y table is a table which is movable in two orthogonal directions x and y. A work to be machined is set on this x-y table. The z-axis driving mechanism 32 is capable of operating in the z-axis direction which is in this case a vertical direction, and an end effector 4 is secured to the end of the z-axis driving mechanism 32. The z-axis driving mechanism 32 is stationed against the movement of the x-y table 31.

The position/force control apparatus used in combination with this machine tool employs a force computing section 33, a position computing section 34 and a motor speed computing section 35 which perform computations different from those of the corresponding sections in the first embodiment. As a result of the computations performed by the force computing section 33, position computing section 34 and the motor speed computing section 35, sections or means corresponding to the coordinate conversion section 10, angle computing section 1 and the angular velocity computing section 23 used in the first embodiment are dispensed with in the second embodiment shown in FIG. 7. More specifically, the force computing section 33 is capable of converting the force detected by the force sensor 4 from a sensor coordinate system into a hand coordinate system, thereby computing the level of the force applied to the hand. In this embodiment, computation of moment is unnecessary because the machine tool has a three-dimensional arrangement. In addition, the gravity compensation can be effected simply by subtracting a constant bias value because the posture of the end effector 4 is not changed. Vectors handled by the force computing section 33 and other sections are all three dimensional translational vectors. The base coordinate system can be set on the x-y table which moves so that the hand coordinate system and the base coordinate system are the same with respect to the direction of movement of the x-y table, so that the force converted into the hand coordinate system by the force computing section 33 can be expressed in terms of the coordinate values of the reference coordinate system.

The position computing section 34 computes the position of the hand by making use of values derived from encoders or linear scales. The hand position in this case is given as the position on the base coordinate system which is fixed to the x-y table 31.

The motor speed computing section 35 directly computes the speed command for each driving motor from the velocity command expressed in terms of the coordinate values of the base coordinate system.

As will be seen from the foregoing description, in this embodiment of the present invention, the x-y-z coordinate system can directly be computed without necessitating the computation of joint angles, unlike the embodiment shown in FIG. 1. In addition, the computation of posture and the computation of the moment which are necessary in the first embodiment are omitted in this second embodiment because the posture of the end effector 4 is not changed.

Consequently, vectors such as $\underline{x}$, $\underline{f}$, and $\underline{v}$ appearing in FIG. 7 are three-dimensional vectors, while the factors such as K, M and C, as well as the coordinate conversion matrixes, are $3 \times 3$ matrices, so that the computation is remarkably simplified as compared with the embodiment shown in FIG. 1.

The operation of this embodiment is basically the same as that of the embodiment shown in FIG. 1 except that end effector 4 does not have degrees of freedom for changing its posture, so that the profiling control is executed a substantially in the same manner as that explained before in connection with FIGS. 5 and 6.

Third Embodiment

Figure 8:
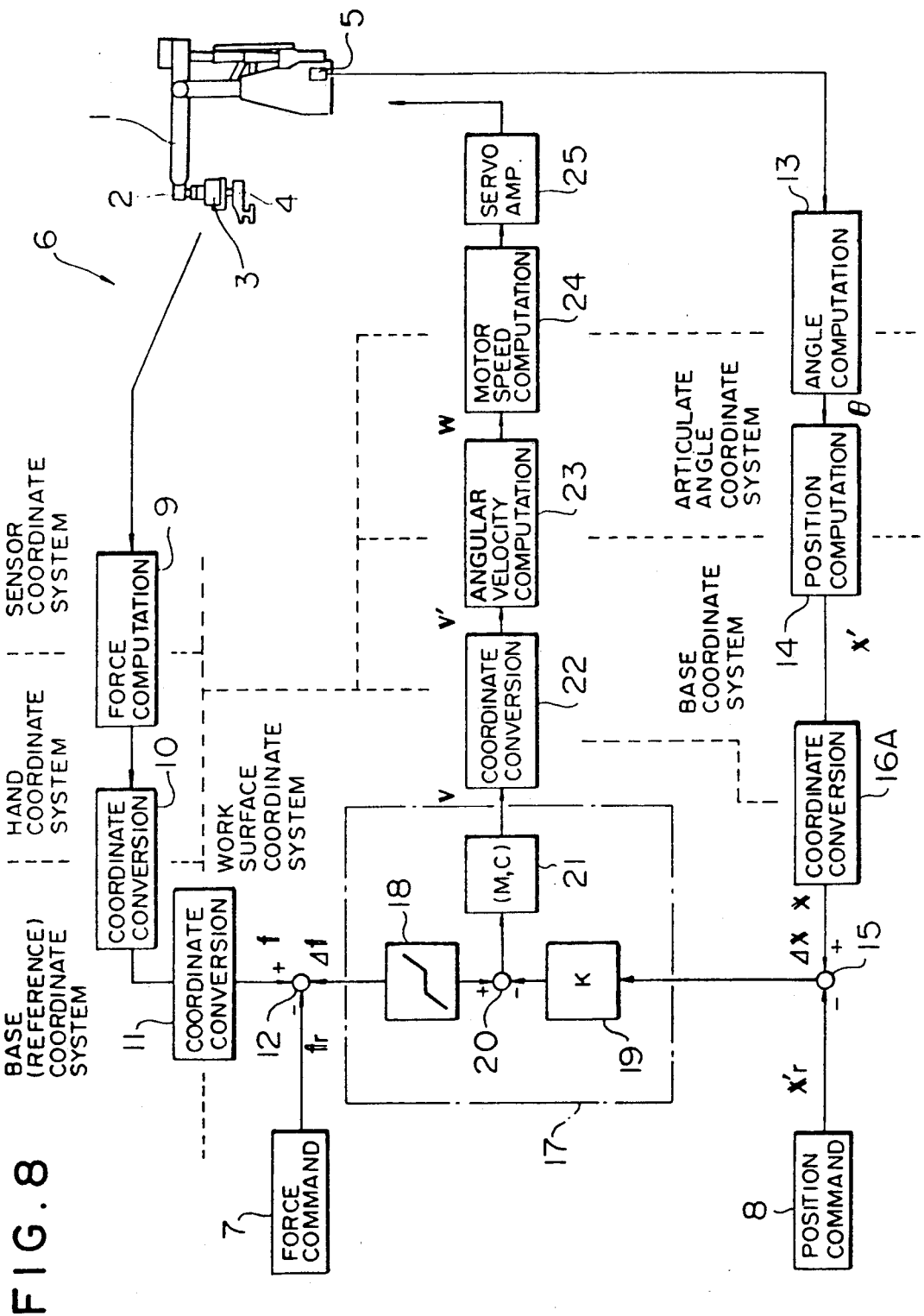
FIG. 8 is a block diagram of a third embodiment of the position/force control apparatus in accordance with the present invention.

A third embodiment of the present invention will be described with reference to FIG. 8.

In the embodiment shown in FIG. 1, the position/posture error $\Delta x'$ determined on the base coordinate system is converted into values of an arbitrary coordinate system, e.g., a work surface coordinate system, by the coordinate conversion section 16, and the error $\Delta f$ of force and the error $\Delta x$ of position determined on this work coordinate system are input to the position/force control computing section 17. Thus, the position command set by the position command setting section 8 is expressed in terms of the coordinate values of the base coordinate system. Therefore, when the work surface is slanted, the moving velocity given by this position command coincides with the set speed in the direction of the movement of, for example, the x-axis direction, but the moving velocity in the direction of the work surface varies according to the gradient of the work surface, with the result that the operation becomes unstable. The third embodiment is intended for obviating this problem by using a coordinate conversion section 16A disposed between the position computing section 14 and the position offset computing section 15.

The coordinate conversion section 16A thus provided enables that the position command is set by the position command setting section 8 in terms of the coordinate values of the work surface coordinate system, so that the values set by the position command setting section 8 determines the moving velocity along the work surface. Therefore, the moving velocity along the work surface is not changed by the gradient of the work surface, so that the control is performed in a stable manner.

Advantages Offered by First to Third Embodiments

To sum up, the first to third embodiments as described offer the following advantages. (1) the directions of axes of the coordinate system on which the position and force are controlled can be set in any desired directions so that the control is performed with the coordinate system which is optimum for the operation to be performed, whereby the operation is conducted in an adequate manner with a high level of efficiency. (2) In case of the profiling operation, the work surface coordinate system can be used as the arbitrary coordinate system, so that it is possible to press the end effector in the direction of the line normal to the work or to set a virtual spring which acts in this direction, while effecting a feed in the tangential direction independently of the pressing or incorporation of the virtual spring in the normal direction, thus enabling the operation to be performed adequately and efficiently. (3) The use of the work surface coordinate system as the arbitrary coordinate system is not exclusive. For instance, by determining the constraint coordinate system in accordance with the reactional force produced as a result of the constraint and the direction of movement, it is possible to effect a complicated operation such as a three-dimensional cranking. (4) The conversion matrix for conversion into the arbitrary coordinate system is given as the posture conversion matrix from the reference coordinate system, so that the conversion matrix can be described in the form of unit vectors of the coordinate axes of the arbitrary coordinate system, whereby the handling is facilitated.

Fourth Embodiment

A fourth embodiment of the present invention will be described hereinunder with reference to FIGS. 9 to 11. In this embodiment, the work surface coordinate system is used as the arbitrary coordinate system on the basis of which the position/force computing section 17 performs the computation, and a function is incorporated by which the data of the work surface coordinate system used for the coordinate conversion by the coordinate conversion sections 16 and 22 are automatically computed.

Figure 9:
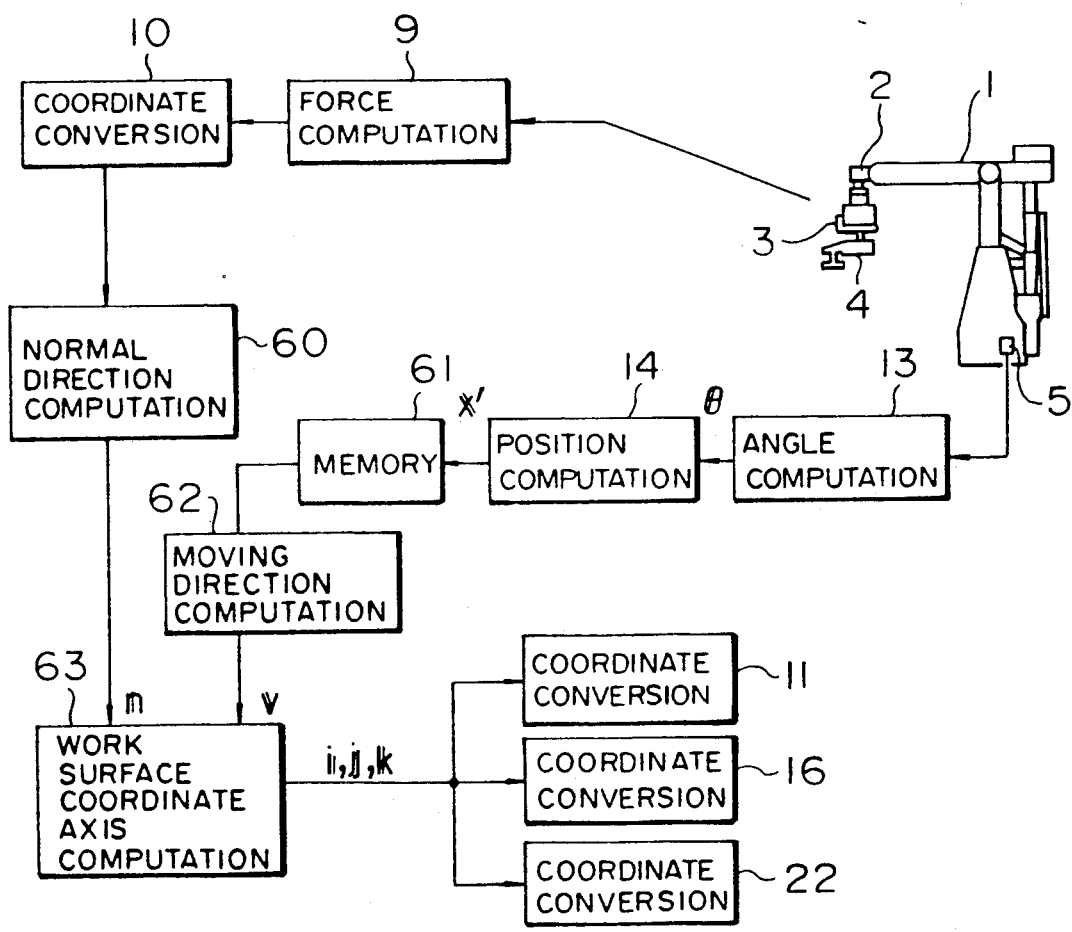
FIG. 9 is a block diagram of a work surface coordinate system computing section of a fourth embodiment of the position/force control apparatus in accordance with the present invention.
Figure 10:
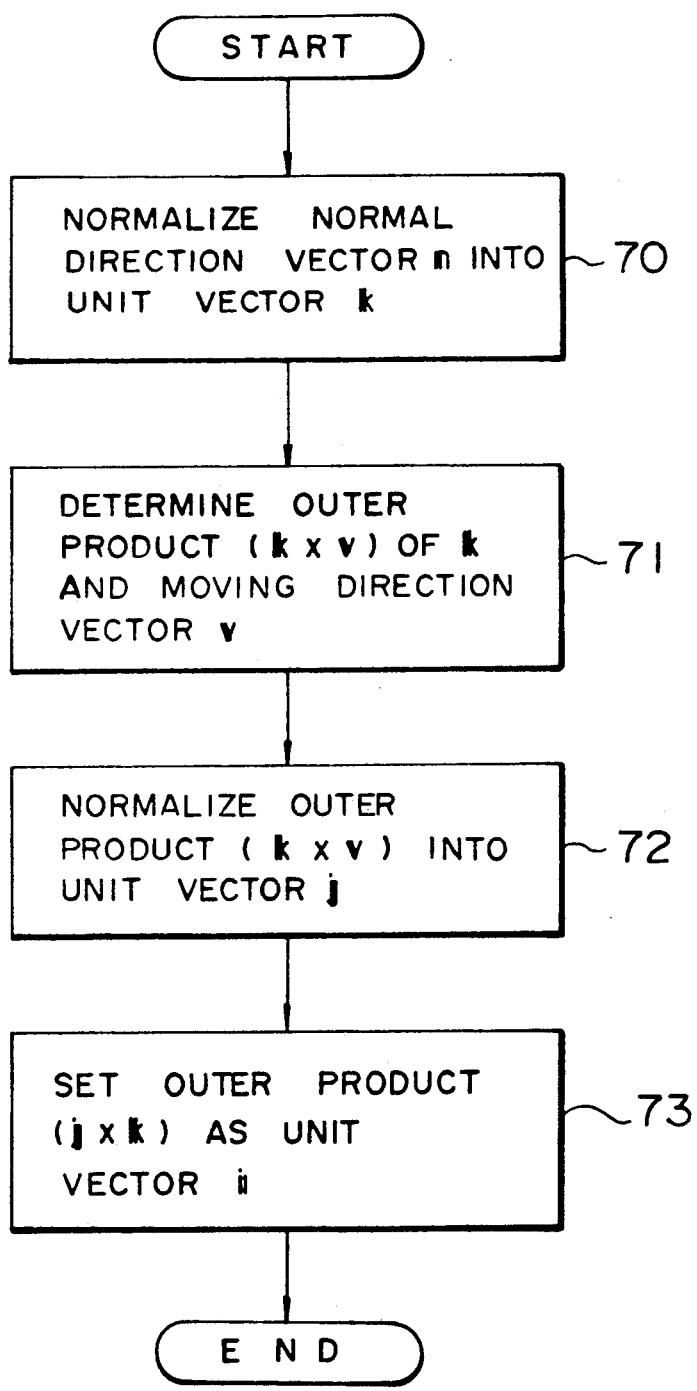
FIG. 10 is a flow chart illustrating the process of computation of coordinate axes performed by the work surface coordinate system computing section.

More specifically, referring to FIG. 9, the fourth embodiment of the apparatus in accordance with the present invention employs a work coordinate system computing section which includes, in addition to the components employed in the embodiment of FIG. 1, a normal direction computing section 60 which determines, from the force data converted into the reference (base) coordinate system by the coordinate conversion section 10 (see FIG. 1), the vector $\underline{n}$ in the direction of the normal to the work surface, a memory section 61 which successively stores position data concerning positions of the hand determined by the position computing section 14 (see FIG. 1) in accordance with the movement of the hand, a moving direction computing section 62 which determines the vector $\underline{v}$ in the direction of movement on the basis of the data stored in the memory section 61, and a coordinate axis computing section 63 which computes the coordinate axes $\underline{i}$, $\underline{j}$ and $\underline{k}$ of the work surface coordinate system in accordance with a procedure shown in FIG. 10 from the normal direction vector $\underline{n}$ and the moving direction vector $\underline{v}$. The number of the position data to be stored in the memory section 61 may be selected within a range which is to be employed in the computation performed by the moving direction computing section 62. The coordinate axes $\underline{i}$, $\underline{j}$ and $\underline{k}$ of the work surface coordinate as computed by the coordinate axis computing section 63 are the coordinate conversion matrix data used in the coordinate conversion sections 11, 16 and 22 shown in FIG. 1.

A description will be given of the operation of the work coordinate system computing section, with specific reference to FIGS. 10 and 11.

Figure 11A:
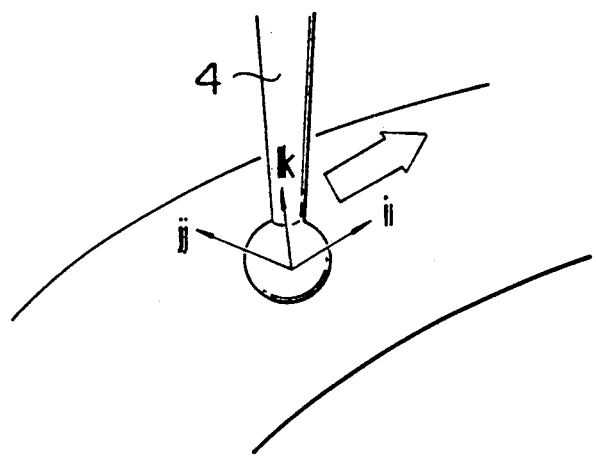
FIGS. 11(*a*) and 11(*b*) are illustrations of the manner for setting coordinate axes.

FIG. 11 is an illustration of the manner in which the work surface coordinate system is given. The work surface coordinate system has coordinate axes which are aligned with a line normal to the work surface and a line tangential to the work surface. The direction of the tangential line, however, is not definitely determined. In this embodiment, therefore, $\underline{i}$, $\underline{j}$ and $\underline{k}$ are set as the coordinate axes as shown in FIG. 11(a), with one of these axes determined to coincide with the direction of movement of the hand. More specifically, $\underline{i}$ represents the unit vector in the direction of the tangential line which is in the direction of movement, $\underline{k}$ represents the unit vector in the direction of the normal line, and $\underline{j}$ is a unit vector which is vertical both to the vectors $\underline{i}$ and $\underline{k}$. The coordinate system $(\underline{i}, \underline{j}, \underline{k})$ is given as a right-hand system.

Figure 11B:
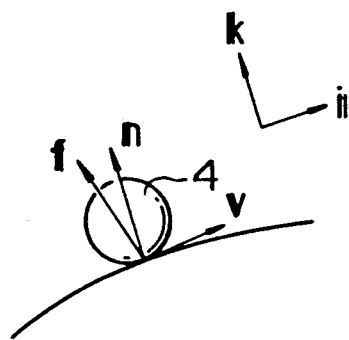

FIG. 11(b) illustrates the $(\underline{i}, \underline{k})$ plane of the coordinate system $(\underline{i}, \underline{j}, \underline{k})$. The reactional force $\underline{f}$ which is applied to the end effector 4 of the robot from the work surface and the vector $\underline{v}$ of the moving direction of the hand are in this plane, so that the vectors $\underline{i}$, $\underline{j}$ and $\underline{k}$ are determined by making use of the reactional force $\underline{f}$ and the moving direction vector $\underline{v}$.

The work coordinate system computing section computes the coordinate axes of the work coordinate system in accordance with the above-described principle. Namely, the force detected by the force sensor 3 is converted by the force computing section 9 and the coordinate conversion section 10 into the force applied to the end effector 4 in terms of the coordinate values of the reference (base) coordinate system. This force corresponds to the reactional force $\underline{f}$ shown in FIG. 11(b). The normal direction computing section 60 then computes the vector $\underline{n}$ of the normal to the work from the thus determined reactional force. This computation is executed in such a manner as to eliminate any influence of friction which is encountered with this control. The most accurate control can be effected when the end effector 4 itself is made of a friction-less probe. In such a case, the detected reactional force $\underline{f}$ acts in the direction of the normal. Namely, the direction of the reactional force $\underline{f}$ and the direction of the normal direction vector $\underline{n}$ coincide with each other in FIG. 11(b). If there is any unavoidable frictional resistance, a predetermined kinetic coefficient of friction is supposed. Such a constant kinetic coefficient of friction maintains a constant angle between the reactional force $\underline{f}$ and the normal direction vector $\underline{n}$ in FIG. 11(b), thus enabling determination of the normal direction vector $\underline{n}$. Further, the line of action of force can be determined if the moment is detected in addition to the force, and the point of contact between the end effector 4 and the work surface can be determined if the outer configuration of the end effector 4 is known, so that the normal direction can be determined regardless of a change in the coefficient of friction.

As explained before, the position of the end effector 4 can be computed by the angle computing section 13 and the position computing section 14. The memory section 61 stores a required number of such position data and the moving direction computing section 62 computes the moving direction vector $\underline{v}$ in accordance with the stored position data. The moving direction vector $\underline{v}$ is the same as the moving speed but the magnitude of this vector need not be the same as the speed because the vector $\underline{v}$ is used only for the purpose of showing the direction. The simplest form of computation of this direction is to calculate the difference between the instant value and the immediately preceding value or one of the preceding values. Other known methods such as use of a weight mean over several points for the purpose of eliminating the error factors such as noises can be used suitably.

It is thus possible to determine the unit vectors $\underline{i}, \underline{j}$ and $\underline{k}$ of the coordinate axes by means of the work surface coordinate axes computing section 63 by making use of the normal direction vector $\underline{n}$ determined by the normal direction computing section 60 and the moving direction vector $\underline{v}$ determined by the moving direction computing section 62. The directions of the unit vectors $\underline{i}$ and $\underline{k}$ theoretically coincide with the directions of the vectors $\underline{v}$ and $\underline{n}$ as will be seen from FIG. 11(b). This, however, does not actually take place because of reasons such as inclusion of measuring errors and noises. Namely, the vectors $\underline{n}$ and $\underline{v}$ may fail to cross each other orthogonally. This embodiment, therefore, is based upon an assumption that the force can be measured with a high level of accuracy, and the normal direction vector $\underline{n}$ is set as the direction of the vector $\underline{k}$, while the vector $\underline{i}$ is determined such that it is perpendicular to the vector $\underline{k}$ within a plane which contains the vectors $\underline{n}$ and $\underline{v}$. The vector $\underline{j}$ is orthogonal to the vectors $\underline{i}$ and $\underline{k}$. FIG. 10 illustrates the process for determining the unit vectors $\underline{i}, \underline{j}$ and $\underline{k}$ of the coordinate axes in this manner.

In Step 70, the normal vector is normalized by being divided by its magnitude $|\underline{n}|$, thus forming a unit vector $\underline{k}$ of a length 1.

In Step 71, outer product $\underline{k} \times \underline{v}$ is computed in order to determine a direction orthogonal to $\underline{k}$ and $\underline{v}$. In Step 72, a unit vector $\underline{j}$ is determined by normalizing the outer product $\underline{k} \times \underline{v}$. In Step 73, a vector $\underline{i}$ is determined as the outer product $\underline{j} \times \underline{k}$, whereby the unit vector $\underline{j}$ orthogonal to the vector $\underline{k}$ in a plane including $\underline{n}$ and $\underline{v}$ is determined.

The Step 71 may be modified such that an outer product $\underline{n} \times \underline{v}$ is determined in place of the outer product x In such a is determined in place of the outer product $\underline{k} \times \underline{v}$. In such a case, the normalization of the vector $\underline{n}$ may be executed after execution of Step 71.

The coordinate axes $\underline{i}, \underline{j}$ and $\underline{k}$ of the work surface thus determined are delivered to the coordinate conversion sections 11, 16 and 22 of the control system of FIG. 1 so as to be used in the coordinate conversion between the work surface coordinate system and the base coordinate system.

As has been described, in this embodiment, the work surface coordinate system on which the position/force control is to be done is automatically computed. If the work surface coordinate system has to be momentarily input along the work surface, a laborious work is required for the operator to successively input different coordinate systems particularly when the work has a complicated curved surface. In this embodiment, such a laborious operation is not necessary because the work surface coordinate system can be determined automatically. In addition, since the computation of the coordinate system is executed momentarily in accordance with the operation of the robot, this embodiment can be applied also to automatic profiling control which requires an on-line generation of the work surface coordinate system.

Modification of Fourth Embodiment

Figure 12:
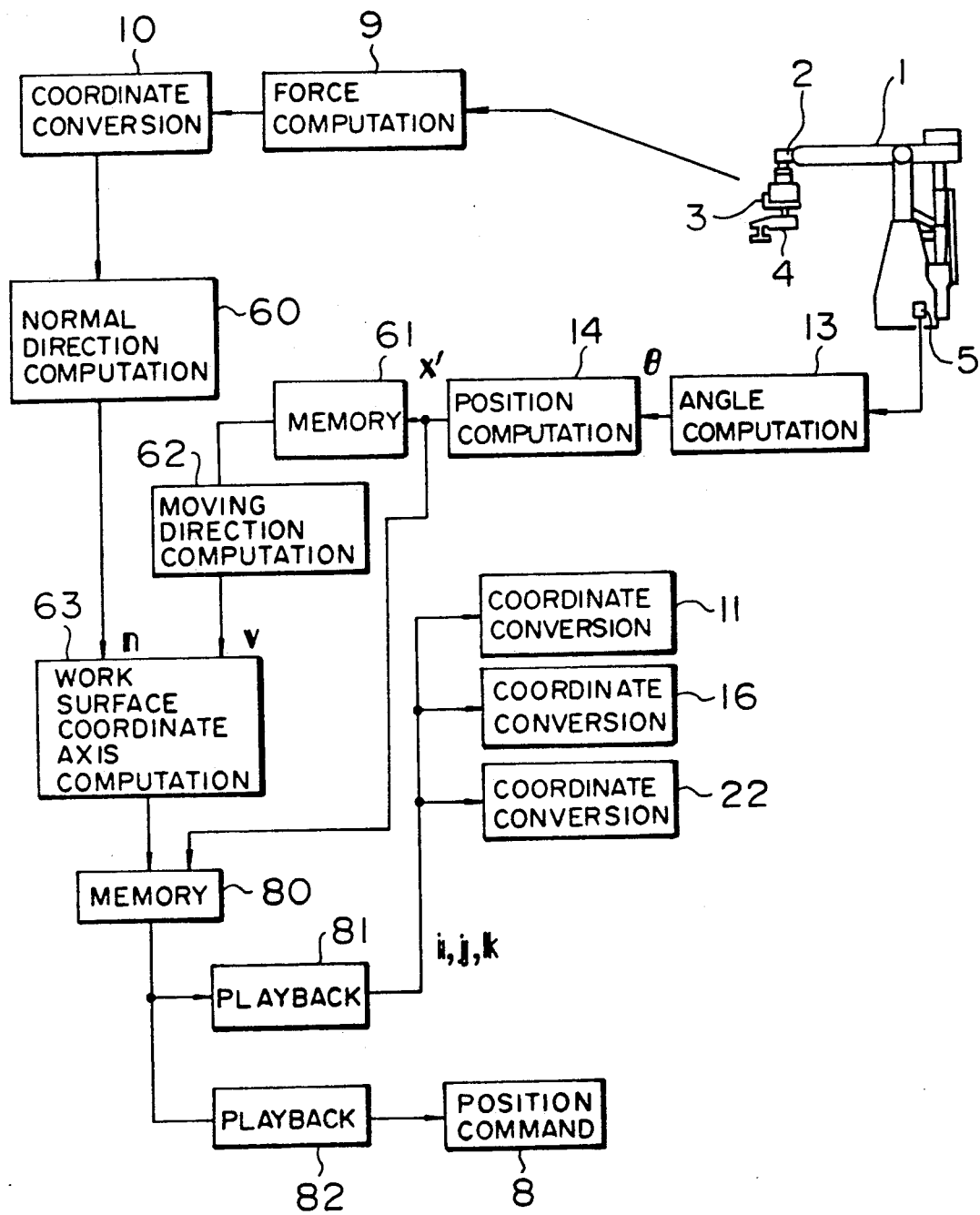
FIG. 12 is a block diagram of a work surface coordinate system in a modification of the fourth embodiment of the present invention.

In the embodiment described hereinbefore, the coordinate axes $\underline{i}, \underline{j}$ and $\underline{k}$ are momentarily executed by the work surface coordinate system computing section in accordance with the operation of the robot. The arrangement may be such that the results of the computation are stored as teaching data and used as coordinate conversion data during play-back operation. FIG. 12 shows an embodiment having such a function. The embodiment shown in this Figure has, in addition to the components shown in FIG. 9, a memory section 80 capable of storing, as teaching data, the vectors $\underline{i}, \underline{j}$ and $\underline{k}$ computed by the work surface coordinate axes computing section 63, together with the position/posture of the hand computed by the position computing section 14. The embodiment also has a play-back section 81 for playing back the stored data $\underline{i}, \underline{j}$ and $\underline{k}$ during the play-back operation and for delivering these data to the coordinate conversion sections 11, 16 and 22 as coordinate conversion data through, for example, interpolation. The embodiment further has a play-back section 82 for playing back the stored position/posture during play-back operation and delivering the same to a position command setting section 8 as the position/posture command through, for example, interpolation.

According to this embodiment, the work surface coordinate system can be given as teaching data together with the position/posture and a working machine having a multiple degrees of freedom can be controlled by making use of the teaching data. Furthermore, the teaching data can be used for the purpose of, for example, form recognition.

Fifth Embodiment

A fifth embodiment which employs a different type of work coordinate system computing section will be described with reference to FIGS. 13 and 14. In these Figures, the same reference numerals are used to denote the same parts as those in FIG. 9.

In the embodiment shown in FIG. 9, the vectorIn in the direction of the normal to the work surface is computed from the force vector as determined by the coordinate conversion section 10, and the unit vectors of the coordinate axes are determined from the normal direction vector $\underline{n}$ and the moving direction vector $\underline{v}$. In the embodiment of FIG. 9, however, the vector cannot be determined precisely unless any influence of the frictional resistance is removed. In consequence, the directions of the vectors $\underline{i}$ and $\underline{k}$ do not precisely coincide with the directions of the vectors $\underline{v}$ and $\underline{n}$. On the other hand, the moving direction vector $\underline{v}$ can be determined comparatively precisely, so that the influence of friction can materially be eliminated if the vectors $\underline{i}, \underline{j}$ and $\underline{k}$ are determined on the basis of the moving direction vector v.

Figure 13:
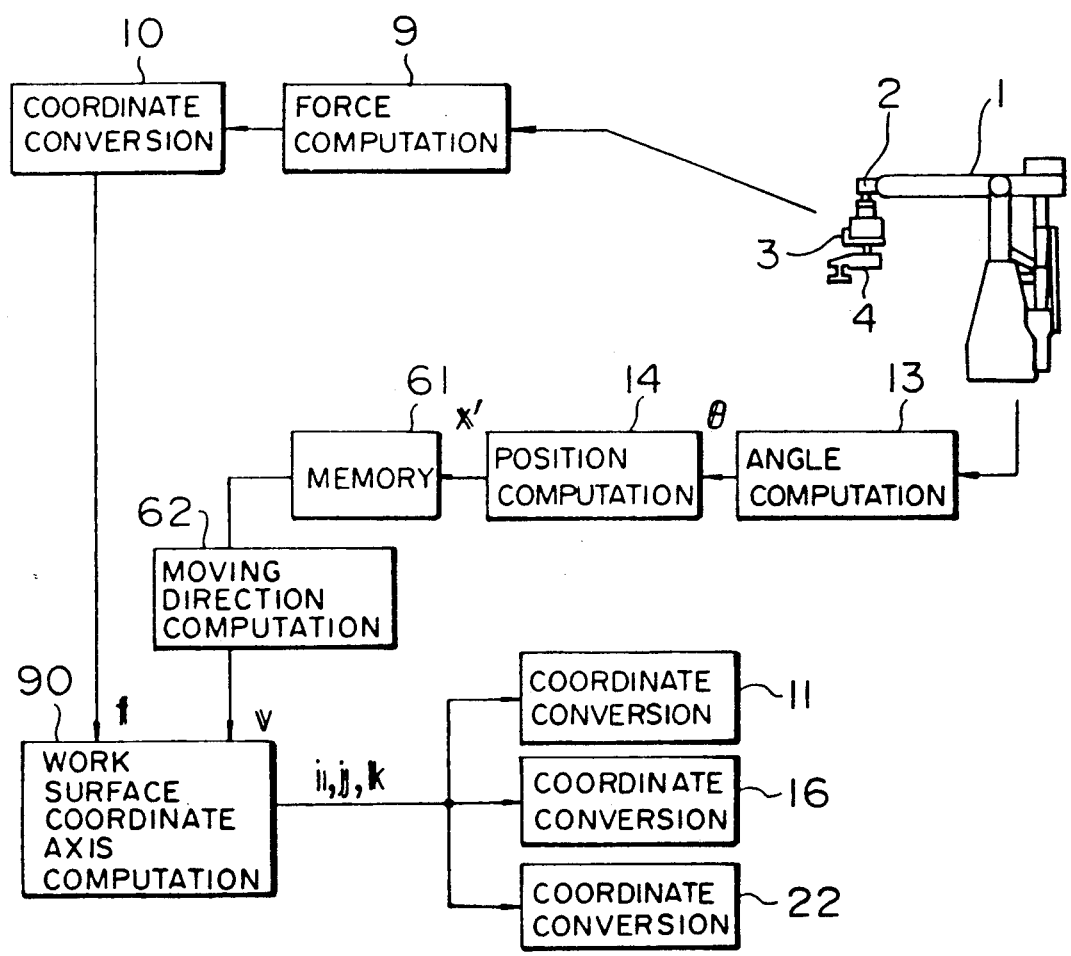
FIG. 13 is a block diagram of a work surface coordinate system computing section in a fifth embodiment of the present invention.

Such a method of determining the vectors i, j and k is adopted in the embodiment shown in FIG. 13. Thus, the embodiment shown in FIG. 13 is devoid of the normal direction computing section 60 used in the embodiment shown in FIG. 9 and the reactional force vector f converted by the coordinate conversion section 10 into the coordinate values of the base coordinate system is directly fed to a work surface coordinate axes computing section 90 which computes the coordinate axes i, j and k of the work surface coordinate system from the force vector f and the moving direction vector v. Namely, the direction of the vector j is set to coincide with the direction of the moving direction vector v, while the vector k is determined to be orthogonal to the vector i within a plane containing f and v. The vector j is determined to be orthogonal to the vectors i and k.

Figure 14:
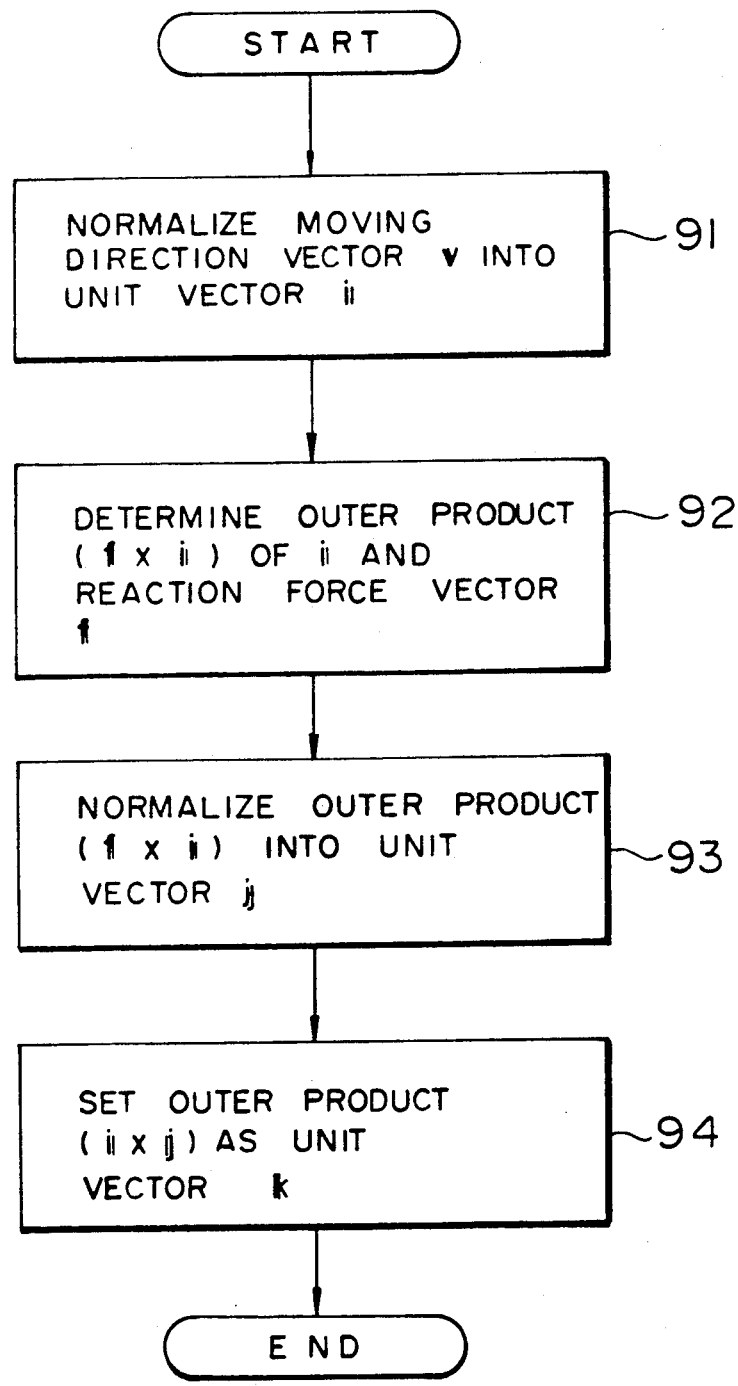
FIG. 14 is a flow chart showing the process of computation of the coordinate axes in a work surface coordinate system computing section of the fifth embodiment.

FIG. 14 is a flow chart illustrating the process of the computation performed by the coordinate axis computing section 90. In Step 91, the moving direction vector v is normalized by being divided its magnitude of size |v| whereby a unit vector i having a length 1 is obtained. In Step 92, an outer product f×i is computed in order to determine the direction perpendicular to the reactional vector f and the unit vector i. In Step 93, the outer product is normalized so that a unit vector j is formed. In Step 94, the outer product i×j is determined as k whereby the unit vector k perpendicular to i and existing in a plane containing f and v can be obtained.

Step 92 for determining the outer product f×i may be modified such as to determine the outer product f×v. In such a case, the normalization of v may be executed after completion of Step 92.

Figure 15:
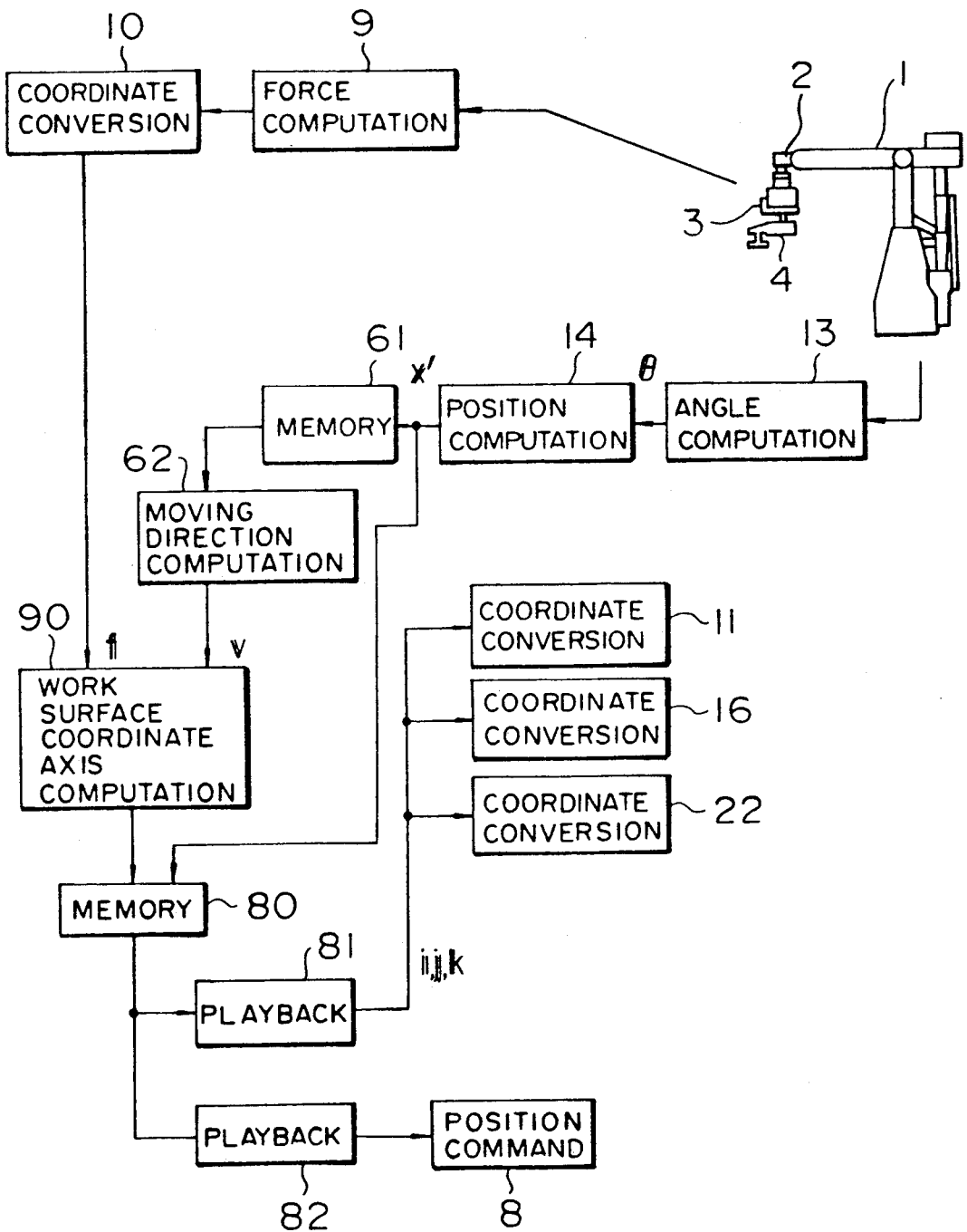
FIG. 15 is a block diagram of a work surface system coordinate computing section in accordance with a modification of the fifth embodiment.

As is the case of the modification of FIG. 12 on the embodiment shown in FIG. 9, the embodiment shown in FIG. 13 may be modified such that the coordinate axis data i, j and k determined through computation are used as teaching data. Such a modification is disclosed in FIG. 15. In FIG. 15, the same reference numerals are used to denote the same parts as those appearing in FIG. 12. It will be clear to those skilled in the art that this embodiment provides the same advantage as that offered by the embodiment of FIG. 12.

Sixth Embodiment

A description will be given of a sixth embodiment which employs a different form of the work coordinate system computing section, with specific reference to FIGS. 16 to 19. In these Figures, the same reference numerals are used to denote the same parts as those appearing in FIG. 9.

Figure 16:
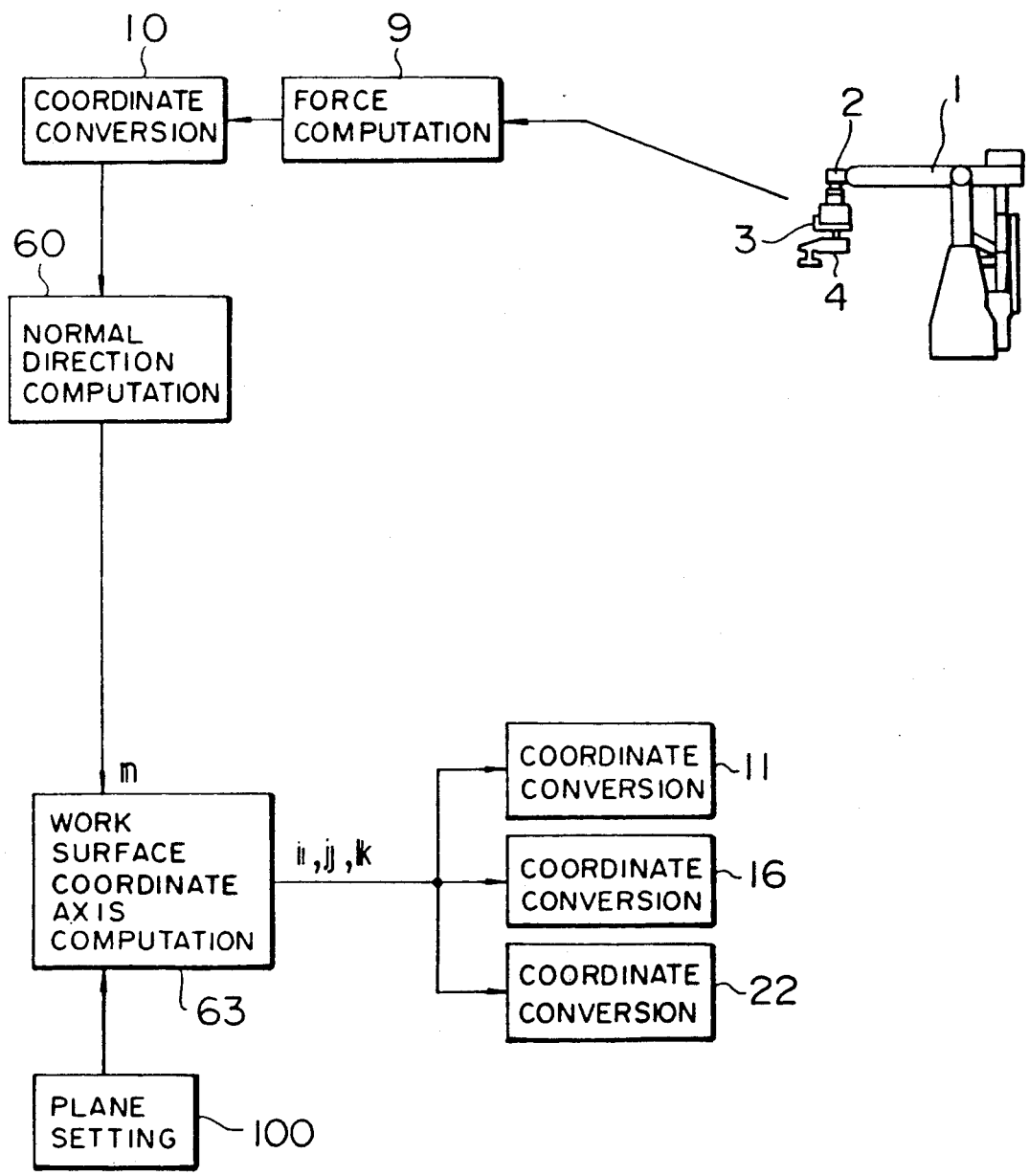
FIG. 16 is a block diagram of a work surface coordinate system computing section of a sixth embodiment of the position/force control apparatus in accordance with the present invention.
Figure 17:
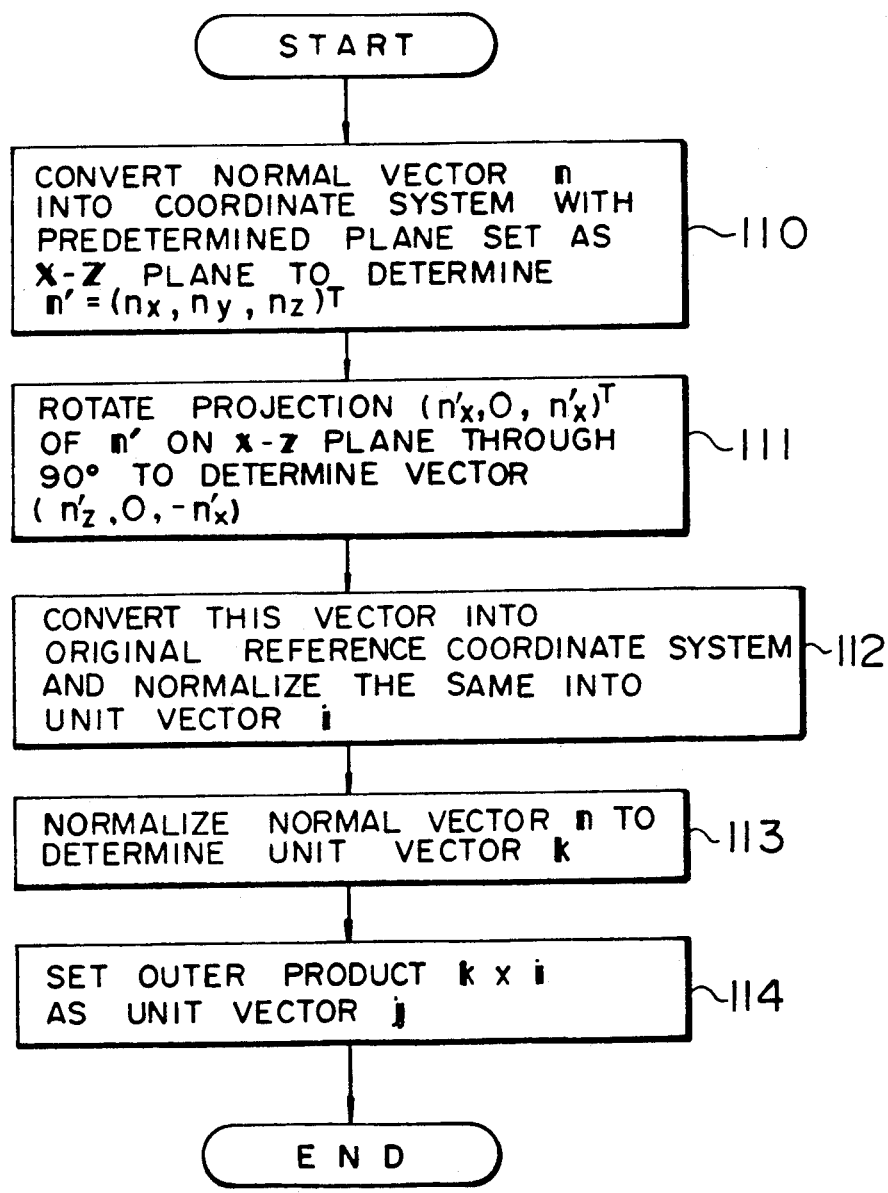
FIG. 17 is a flow chart showing the process of computation of the coordinate axes performed by the work surface coordinate system computing section in the sixth embodiment.

Referring to FIG. 16, the work coordinate system computing section has a normal direction computing section 60 for determining the normal direction vector n in the direction of normal to the work surface, from the force data which has been converted into the reference (base) coordinate system by the coordinate conversion section 10 (see FIG. 1) a plane setting portion 100 for pre setting an arbitrary plane p (see FIG. 18) in terms of coordinate axes vectors of a coordinate system which has two axes contained by this plane, and a coordinate axis computing section 63 which computes the coordinate axes i j and k of the work surface coordinate in accordance with a process shown in FIG. 17, from the normal direction vector n as determined by the normal direction computing section 60 and the coordinate axes vectors which represent the plane P pre-set by the plane setting section 100. In the case of a working machine in which the direction of feed is beforehand determined as in the case of automatic profiling, the plane pre-set by the plane setting section 100 should contain the direction of the feed. The coordinate axes i, j and k computed by the coordinate axes computing section 63 is used as data for the coordinate conversion matrix used in the coordinate conversion sections 11, 16 and 22 shown in FIG. 1.

The operation of the work coordinate system computing section used in this embodiment will be described with reference to FIGS. 17 to 19.

Figure 18:
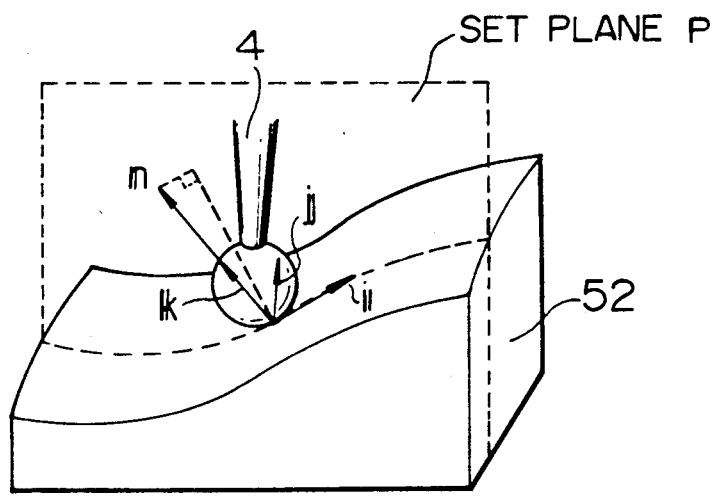
FIG. 18 is an illustration of the manner of setting the coordinate axes.
Figure 19:
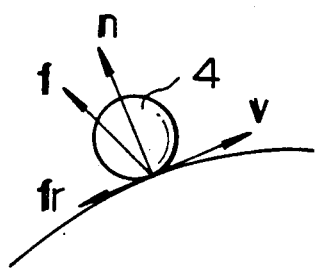
FIG. 19 is an illustration of the relationship between reactional force, frictional force, moving direction and a normal.

FIG. 18 illustrates the manner for setting the work surface coordinate system. The work surface coordinate system has coordinate axes which coincide with the lines normal and tangential to the work surface, respectively. The tangential line, however, cannot be determined definitely. In this embodiment, the line at which the work 52 intersects the plane P pre-set by the plane setting section 100 is used as the coordinate axis of the tangential direction. Thus, the work surface coordinate system in this case employs coordinate axes i, j and k as shown in FIG. 18. The vector i is a unit vector in the direction of line of intersection between the pre-set plane P and the tangential plane of the work surface, the vector k is a unit vector in the direction of the normal, and the vector j is a unit vector which is perpendicular to the vectors i and k. The coordinate system i, j, k) is given a right-hand system.

The reason why the line of intersection between the pre-set plane P and the tangential plane is selected as one of the coordinate axes is that the feed is effected in this direction when the system is applied to an automatic profiling. The feed in the direction of the vector i ensures that the end effector is fed on this plane because the direction of the vector i is in this plane P. Namely, the hand can be fed along the line of intersection between the plane P and the work as shown by a broken line in FIG. 18.

The work coordinate system computing section of this embodiment computes the coordinate axes of the work coordinate system in accordance with the above-described principle. Namely, the force detected by the force sensor 3 is converted into the force acting on the end effector 4 in terms of the coordinate values of the reference (base) coordinate system by the force computing section 9 and the coordinate conversion section 10 as described before. This force corresponds to the reactional force f shown in FIG. 19. The normal direction vector n in the direction of normal to the work surface is computed by the normal direction computing section 60 from the thus determined force f. This computation is executed in such a manner as to eliminate any influence of frictional force fr because the control is significantly influenced by the frictional force. In order to attain the highest accuracy of the control, it is advisable that the end effector 4 itself is made from a friction-less probe. In such a case, the reactional force f detected as described above acts in the direction of the normal to the work surface. i.e., referring to FIG. 19, the direction of the reactional force vector f coincides with the direction of the normal direction vector When frictional force is inevitable, a constant kinetic coefficient of friction is employed so as to provide a constant angle formed between the vectors f and n in FIG. 19, so that the normal direction vector n can be determined. Furthermore, detection of moment in addition to the detection of the force enables determination of the line of action of the force and the point of contact can be determined if the outer configuration of the end effector 4 is determined, whereby the direction of the normal can be always determined regardless of a change in the coefficient of friction.

The plane setting section 100 expresses the plane P in terms of a coordinate system two axes of which are included in this plane P. In this case a coordinate system having an x-z plane coinciding with the plane P is expressed in terms of unit vectors ex, ey and ez.

Thus, the unit vectors i, j and k of the coordinate system are determined by the work surface coordinate axis computing section 63 by making use of the normal direction vector n determined by the normal direction computing section 60 and the plane which is pre-set by the plane setting section 100. The direction of the unit vector i coincides with the direction of line of intersection between the plane P set by the plane setting section and the tangential plane. The direction of the unit vector k coincides with the direction of the normal direction vector n. The vector j is orthogonal to both the unit vectors i and k. FIG. 17 illustrates the process for determining the unit vectors i, j and k of the coordinate axes in this manner.

In order to compute the direction of the line of intersection between the pre-set plane P and the tangential plane of the work 52, the normal vector n is projected on the pre-set plane P and the projection is rotated through 90° within the pre-set pane P to determine the direction of the line of intersection. This computation is most simply executed by employing an intermediate step for conversion into a coordinate system two axes of which are included in the pre-set plane P. To this end, in Step 110, the normal direction vector n is converted into a coordinate system two axes of which are included in the pre-set plane. The normal direction vector on this coordinate system is expressed as $n' = (nx, ny, nz)^T$, where T represents a transposition of the matrix the vector n represents a column vector. This coordinate conversion can be effected by making use of the unit vectors ex, ey and ez representing the coordinate axes set by the plane setting section: namely, using $(ex, ey, ez)^T$ as the coordinate conversion matrix so as to determine $n = (ex, ey, ez)^T n$.

In Step 111, the vector n is projected onto the x-z plane and rotated through 90°. The projection of the vector n' onto the x-z plane is determined by the x-axis component and the z-axis component of the vector n and, therefore, is given by $(n'x, 0, n'z)^T$. In order to rotate this projection through 90° in the x-z plane, n'z is changed into the x-axis component and $-n'x$ is changed into the z-axis component. Thus, the vector after the 90° rotation is given by $(n'z, 0, -n'x)^T$. Therefore, the vector $(n'z, 0, -n'x)^T$ can easily be computed from the vector n' as determined in Step 110.

The vector $(n'z, 0, n'x)^T$ in the direction of the line of intersection is thus determined. Since this vector is expressed in terms of the coordinate values of the coordinate system which is set by the plane setting section, it is necessary to effect a coordinate conversion so as to express the vector in terms of the original coordinate system. This can be achieved by executing a process which is reverse to that of the coordinate conversion explained above, and the conversion matrix comprises an inverse to the aforesaid matrix, which is represented by (ex, ey, ez). Thus, the vector in the direction of line of intersection is determined by $(ex, ey, ez)(n'z, 0, -n'x)^T$. This vector is then normalized by being divided by the length of the vector so that a vector of a length 1 is obtained as the unit vector i. This operation is executed in Step 112.

In Step 113, the normal direction vector n is normalized so that the unit vector k is determined.

In Step 114, the outer product k×i is computed to determine the unit vector j which is normal to the vectors k and i.

The coordinate axes i, j and k of the work surface coordinate system are thus determined. These vectors i, j and k are delivered to the coordinate conversion sections 11, 16 and 22 of the control system shown in FIG. 1 so as to be used for the purpose of coordinate conversion between the work surface coordinate system and the base coordinate system.

In the embodiments described hereinbefore, the pre-set plane P can be determined freely. However, the computation will be much facilitated if the pre-set plane P is determined as a plane which contains two axes of the base coordinate system. For instance, if the x-z plane of the base coordinate system is used as the plane P, the coordinate conversion operations executed in Steps 110 and 112 in FIG. 17 can be dispensed with, so that the computation is very much facilitated. In this case, the plane setting section 100 shown in FIG. 16 is not required to perform any computation.

As is the case of the fourth embodiment described before, the sixth embodiment enables an easy setting of the work surface coordinate system even in case of a complicated curved surface which otherwise would require a laborious manual input of successive coordinate systems. In case of automatic profiling, it is necessary that the work surface coordinate systems are generated successively in an on-line manner. It will be seen that the sixth embodiment well copes with such a demand.

In the sixth embodiment described hereinabove, the vector in the direction tangent to the work surface is determined by using both the detected value of the force and a pre-set plane, so that the unit vector i of one of the coordinate axes is set on the pre-set plane. Therefore, the end effector can always be fed in a direction parallel to the set plane by operating the position command setting section 8 (see FIG. 1) such as to effect the feed in the i direction, whereby the error in the direction of movement can be decreased.

Modification of Sixth Embodiment

A modification of the sixth embodiment will be described with specific reference to FIG. 20. In the sixth embodiment, the end effector 4 itself is made of a friction-less probe or a predetermined value of kinetic coefficient of friction is assumed in order to eliminate any influence of the frictional force fr in the computation of the normal direction vector n. This modification employs another method of eliminating the influence of the frictional force fr. Namely, in this modification, the influence of the frictional force fr is eliminated by using the moving direction vector v. The moving direction vector v can be determined comparatively precisely from informations such as the velocity information or the position information. This moving direction vector v therefore is used as the direction tangent to the work. On the other hand, the reactional force vector f is inclined towards the frictional force vector fr but is in the plane formed by the normal direction vector n and the moving direction vector v. The normal direction vector n therefore can be determined as a vector of a direction which is orthogonal to the vector $\underline{v}$ and which is contained in a plane constituted by the vectors $\underline{f}$ and $\underline{v}$. Actually, a vector $\underline{P}$ orthogonal to the vectors $\underline{f}$ and $\underline{v}$ are determined by computing the outer product $\underline{P} = \underline{f} \times \underline{v}$. Then, the normal direction vector $\underline{n}$ which is orthogonal to the vectors $\underline{v}$ and $\underline{P}$ is determined by computing the outer product $\underline{n} = \underline{v} \times \underline{P}$.

The moving direction $\underline{v}$ can be determined from the velocity information or the position information. The modification shown in FIG. 20 makes use of the position information for this purpose.

Figure 20:
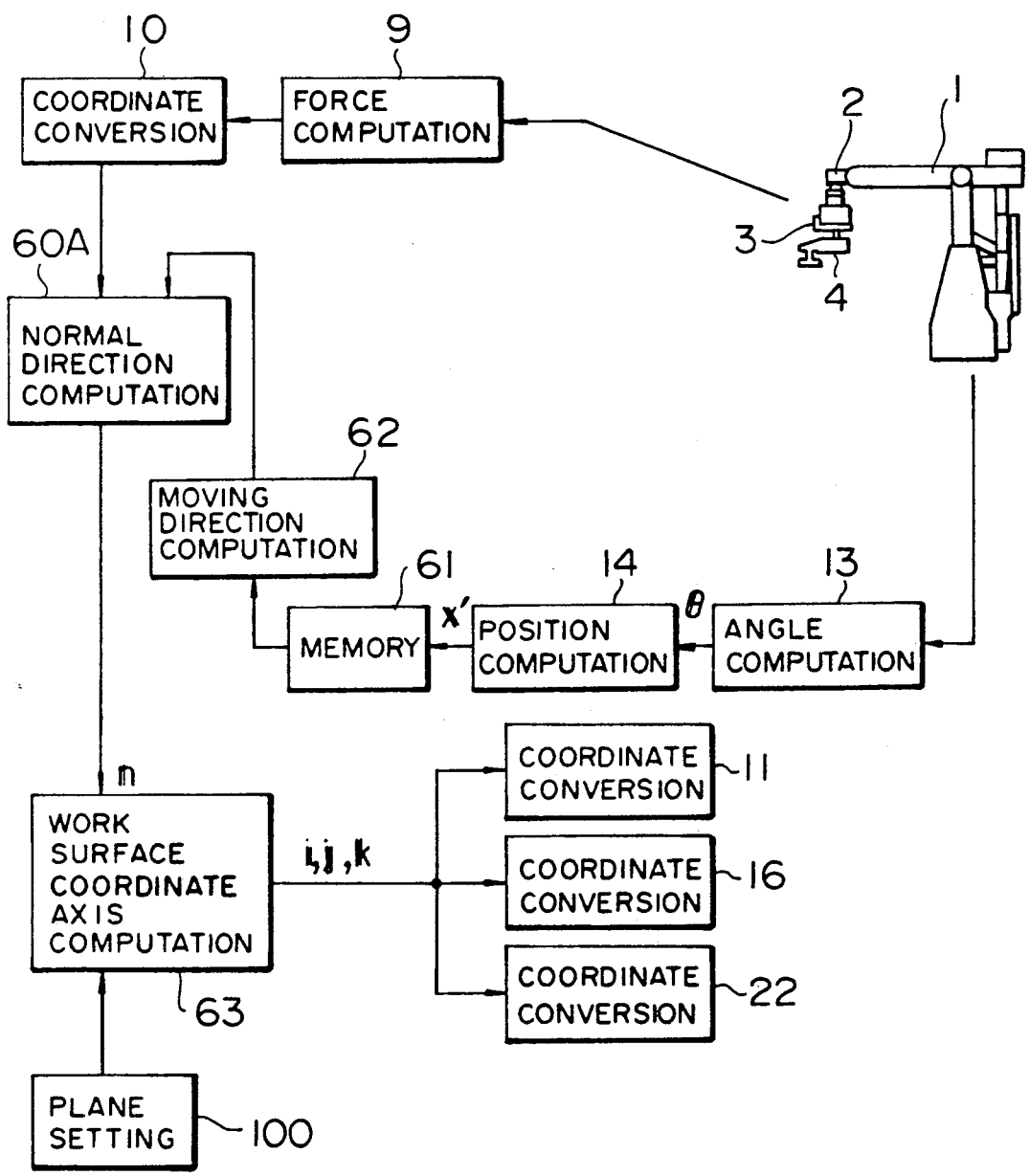
FIG. 20 is a block diagram of a work surface coordinate system computing, section of a modification of the sixth embodiment.

Referring to FIG. 20, the position of the end effector 4 is computed by the angle computing section 13 and the position computing section 14. A required number of positions thus computed are stored in the memory section 61 and the moving direction vector $\underline{v}$ is computed by the moving direction computing section 62.

The normal direction computing section 60A computes the normal direction vector $\underline{n}$ in accordance with the above-described method from the thus computed moving direction $\underline{v}$ and the force vector $\underline{f}$ obtained through conversion performed by the coordinate conversion section 10.

According to this embodiment, the normal direction vector can be determined without influence of frictional force so that the work surface coordinate system can be determined accurately by making use of the position information which has already been detected in the force/position control.

In the fourth to sixth embodiments described before, the moving direction vector $\underline{v}$ which represents the moving direction of the end effector 4 and which is used for the purpose of computation of the coordinate axes of the work surface coordinate system is computed from the joint angle data which is derived from the angle sensor 5 capable of detecting the angle of the end effector. This, however, is not exclusive and the moving direction vector $\underline{v}$ can be computed from the velocity data derived from a velocity sensor capable of detecting the moving velocity of the end effector 4.

Advantages of Fourth to Sixth Embodiments

To sum up, the fourth to sixth embodiments offer the following advantages.

(1) The coordinate axes used for the control computation of position and force are automatically computed from the detected value of the force and the moving direction or a pre-set plane, so that the coordinate system is always optimized for the content of the operation, whereby the required operation is performed optimumly and efficiently.

(2) In case of the curved surface profiling operation, the control is executed through computation of coordinate axes of the work surface coordinate system, so that it is possible to press the end effector in the direction normal to the work surface or to set a virtual spring in this direction, while the feed in the tangential direction can be effected independently of the operation in the normal direction, whereby the operation can be achieved appropriately and efficiently. In addition, it is easy to effect a profiling operation in which the surface of an unknown object is followed through continuous computation of the work surface coordinate system.

(3) In case of a curved surface profiling operation, the vector in the direction tangent to the work surface is obtained by making use of detected values of the force and pre-set plane, and the unit vector of one of the axes is set on the pre-set plane. By setting the position command such as to effect the feed in the direction of this unit vector, therefore, it is possible to set the moving direction in parallel to this pre-set plane, whereby error in the moving direction can be decreased.

(4) Since the work surface coordinate system can be computed, it is easy to add such a function as to maintain a constant posture of the tool with respect to the work.

(5) The coordinate axis data obtained through computation can be stored in a memory for playback operation, so that the teaching of the coordinate system can be given easily, thus enabling the coordinate system to be used freely. In addition, since the teaching data is stored, it is easy to know the direction of the object surface, thus enabling the control system to be used for other purposed such as, for example, shape recognition.

Seventh Embodiment

A seventh embodiment of the present invention will be described with reference to FIGS. 21 to 26. In these Figures, the same reference numerals are used to denote the same parts as those appearing in FIG. 1.

Figure 21:
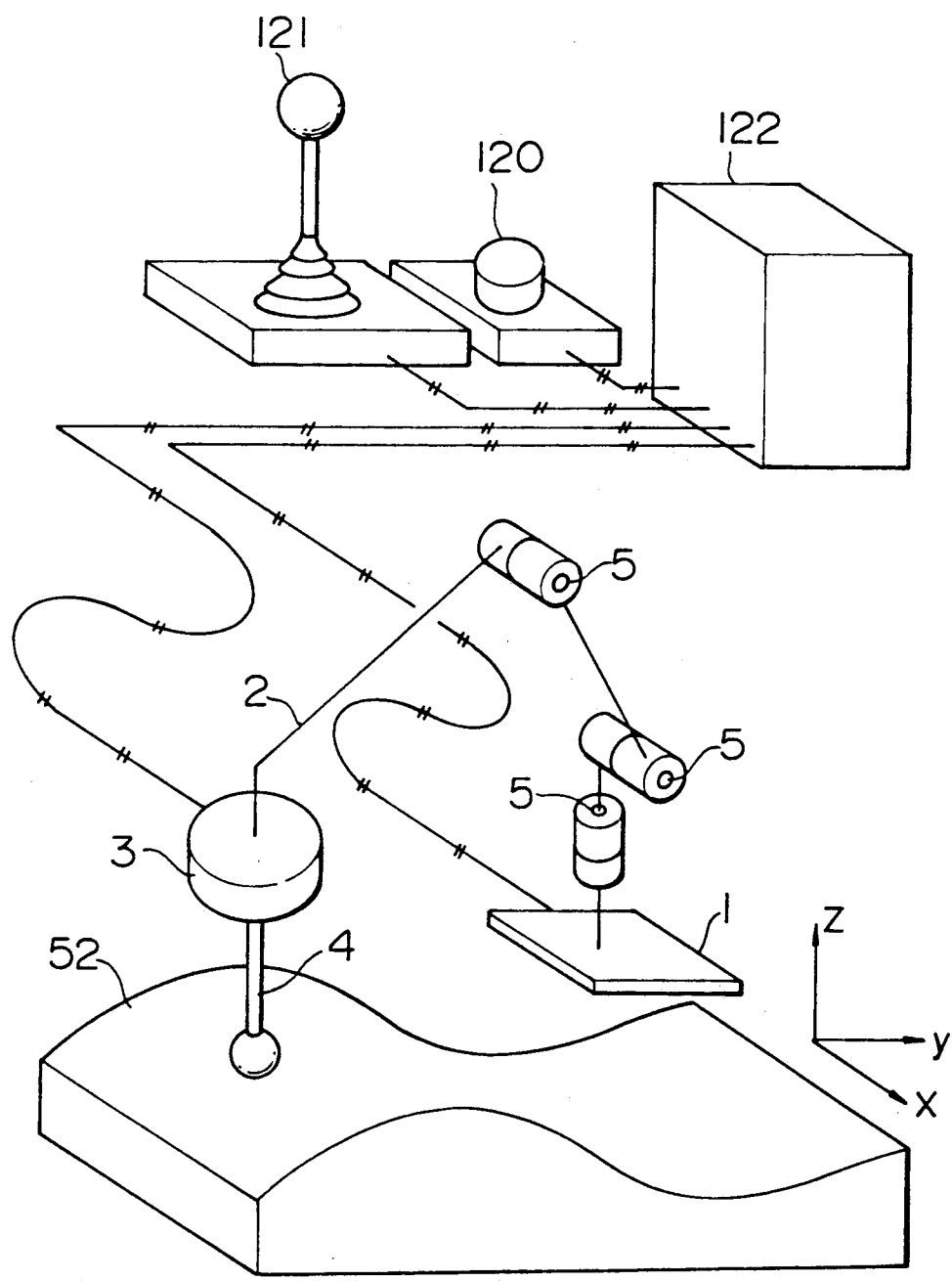
FIG. 21 is a schematic illustration of the entire portion of a curved surface profiling control apparatus for a working machine of a multiple-degree-of-freedom working machine in accordance with a seventh embodiment of the present invention.

Referring to FIG. 21, a robot 1 is provided with a working tool 4 which is provided on an end of a hand 2 and which is movable to any desired position to profile the curved surface of a work 52. Basically, the robot 1 has two or more degrees of freedom. In this embodiment, however, it is assumed that the robot has three degrees of freedom, for the purpose of simplification of explanation.

The control system for the robot 1 has a force setting device 120 capable of generating one signal and setting the magnitude of the force to be applied to the working tool 4, a two-dimensional input device 121 capable of generating two independent signals and determining the direction and magnitude of movement of the working tool 4, a force sensor 3 connected between the hand 2 and the working tool and capable of detecting the level of the force applied to the working tool 4, angle sensors 5 for detecting the respective joint angles of the robot 1, and a controller 122 for delivering a control signal to the robot 1 in accordance with the informations given from the force setting device 120, two-dimensional input device 121, force sensor 3 and the angle sensors 5.

The force setting device 120 maybe an analog input device such as a potentiometer. Alternatively, a digital input device such as a ten-key device may be used as the force setting device. The two-dimensional input device 121 may be a device such as a joy stick device. The force sensor 3 is capable of measuring forces in the direction of the three orthogonal axes corresponding to the three degrees of freedom possessed by the robot 1. A potentiometer or an encoder connected to the driving motor for causing movement of each joint may be used as the angle sensor 5.

Generally, the controller 122 determines the cartesian coordinate system which defines the space in which the working tool 4 moves. The controller 122 performs a control computation for producing a command of the level of the force set by the force setting device 120 for one of three orthogonal axes, while performing a control computation for producing a command of the direction and magnitude of movement set by the two-dimensional input device 121 on the remainder two of the three orthogonal axes. In this embodiment, work surface coordinate system, which has the origin on the end of the working tool 4 contacting the work surface and one axis which is normal to the work surface, is used as the cartesian coordinate system, and control computation for position and force is executed by virtual compliance control.

Figure 22:
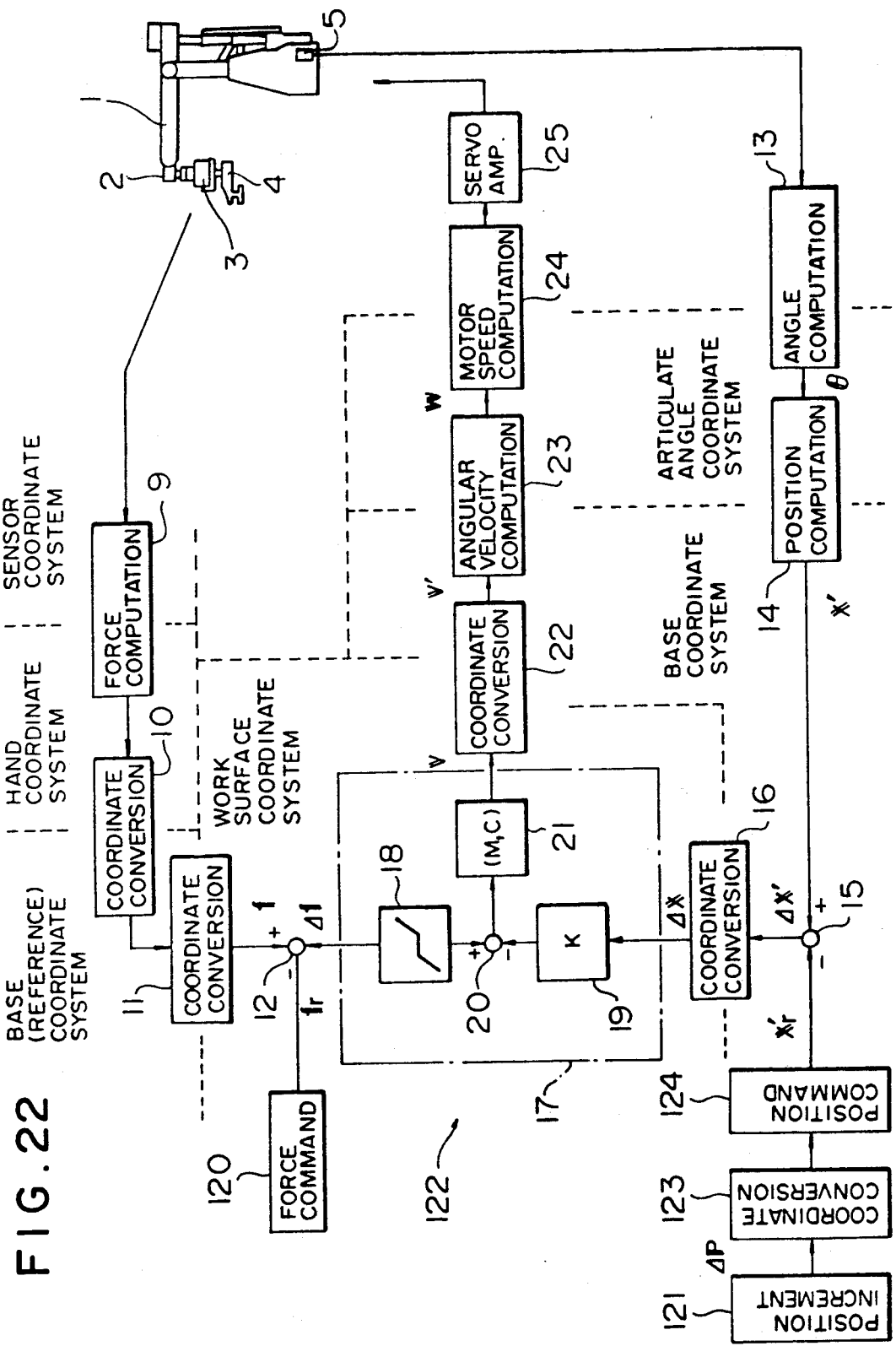
FIG. 22 is a control block diagram showing the content of the control performed by the control apparatus of FIG. 21.

FIG. 22 illustrates the control blocks in the controller 122. The force detected by the force sensor 3 is converted into the value $\underline{f}$ of the work surface coordinate system, through the operations of the force computing section 9 and the coordinate conversion sections 10 and 11. The value $\underline{f}$ is compared by the comparator 12 with the force command $\underline{f}r$ (force Fr exists only in z-axis direction while force components in other axis directions are zero) input by the force setting device 120, whereby an error $\Delta\underline{f}$ is determined.

On the other hand, the joint angle data from the angle sensor 5, e.g., an encoder, capable of detecting the angle of each joint is converted into value $\underline{x}$ on the base coordinate system by means of the angle computing section 13 and the position computing section 14. The two-dimensional input device 121 capable of setting the direction and magnitude of movement of the working tool 4 is designed to compute, at a predetermined period or interval, the position increment $\Delta\underline{P}(i)$ which is composed of an x-axis component $\Delta P(i)x$ and a y-axis component $\Delta P(i)y$. The increment is converted by the coordinate conversion section 123 into the coordinate values of the base coordinate system and is added by the position command computing section 124 to the instant position command $x'r(i)$, whereby a new position command $x'r(i+1)$ is created. Thus, the position command computing section 124 performs the following computation.

$$x'r(i+1) = xr'(i) + \Delta\underline{P}(i) \ldots \quad (2)$$

This computation may be executed in the two-dimensional input device 121.

The value $r(i+1)$ computed by the position command setting section 124 is output as a new position command $\underline{x}'r$ and is compared by the comparator 15 with the position value $\underline{x}'$ derived from the position computing section 14, whereby an error $\Delta\underline{x}$ is computed The value $\Delta\underline{x}'$ is converted by the coordinate conversion section 16 into coordinate value $\Delta\underline{x}$ of the work surface coordinate system.

The errors $\Delta\underline{f}$ and $\Delta\underline{x}$ are input to the force/position control computing section 17 which performs a computation for virtual compliance control. The value $\underline{v}$ obtained as a result of the computation is converted into coordinate values of the base coordinate system by means of the coordinate conversion section 22 and is delivered through the angular velocity computing section 23 and the motor speed computing section 24 into the servo amplifier 25, thereby controlling the movement of the robot 1.

Figure 23:
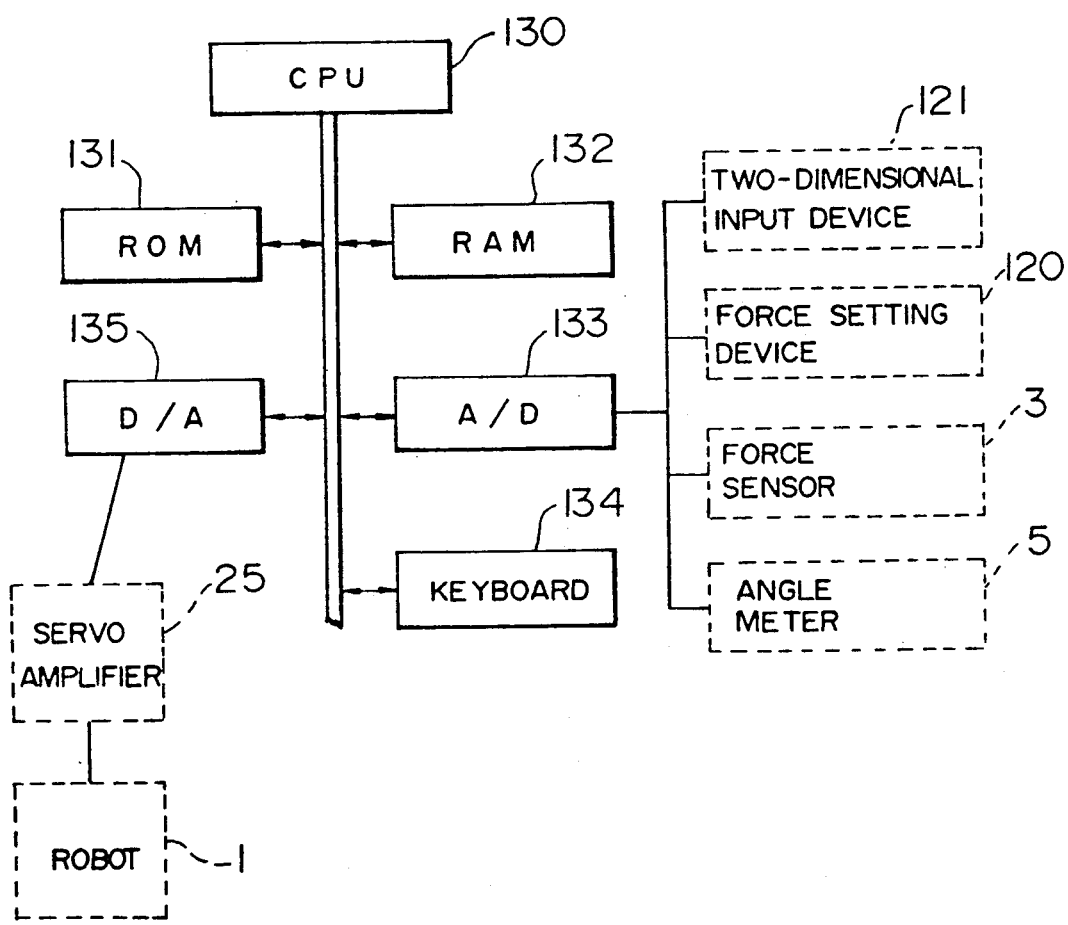
FIG. 23 is a schematic illustration of the hardware of the control apparatus of FIG. 21.

FIG. 23 shows the hardware of the controller 122. The controller 122 has a CPU 130 which is capable of controlling the control computation in accordance with control block diagram as shown in FIG. 22. The program for executing this process is beforehand input to a ROM 131. A RAM 132 is used for storing results of computations performed in intermediate steps of the process. Analog signals from the force setting device 120, two-dimensional input device 121, force sensor 3 and the angle sensor 5 are digitized and processed by an A/D converter 133. When a keyboard 134 is used as the force setting device 120, the digital outputs from the keyboard 134 are directly input to the system. The result of the final computing process is changed into analog signal by means of a D/A converter 135, and the robot 1 is operated in accordance with this analog signal through the servo amplifier 25.

Figure 24:
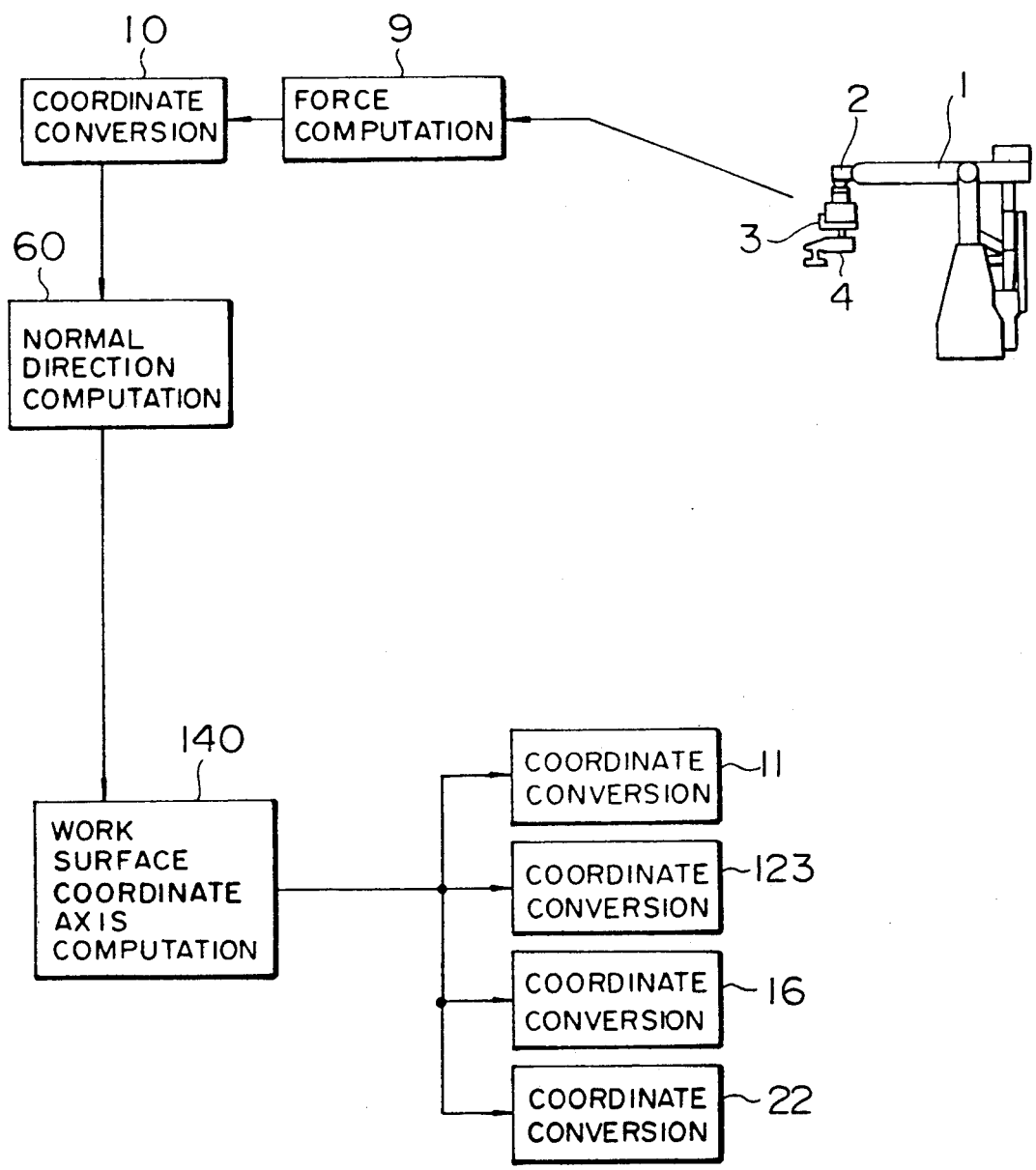
FIG. 24 is a control block diagram showing the content of the control for the work surface coordinate system computation performed in this control apparatus of FIG. 21.

Each of the coordinate conversion sections 11, 16, 22 and 123 is required to compute the work surface coordinate system which is to be used as the data for coordinate conversion matrix which is used in the conversion from the base (reference) coordinate system to the work coordinate system or vice versa. FIG. 24 illustrates control blocks required for such a computation of the work surface coordinates. When the working tool 4 is held in contact with the work surface, a reactional force is applied in the direction normal to the tangential plane, and this reactional force is detected by the force sensor 3. The thus detected reactional force is converted by the coordinate conversion section 10 into values of the base coordinate system. The reactional force converted into the values of the base coordinate system is used in the computation for determining the work surface coordinate system. This computation may be executed by a method which is a simplified form of the method explained before in connection with the sixth embodiment. In this embodiment, the coordinate axes $\underline{i}$, $\underline{j}$ and $\underline{k}$ of the aforementioned work surface coordinate system are represented as $x_i$, $y_i$ and $z_i$.

Namely, the direction of the reactional force which is converted into values of the base coordinate system is determined as the direction of the normal to the work surface, by the normal direction computing section 60. Then, a coordinate axis computing section 140 for the work surface coordinate system determines, as the direction of the $Z_i$ axis of the work surface coordinate system, the direction of the normal which coincides with the direction of the reactional force after the conversion into the base coordinate system. The coordinate axis computing section 140 beforehand stores data Ob-xbyb2b (see FIG. 25) of the base coordinate system. The coordinate axis computing section 140 therefore can determine the $x_i$ axis as the axis which is in the xb-zb plane of the base coordinate system and which is orthogonal to the $z_i$ axis. Then, the yi axis is determined to be orthogonal both to the $z_i$ and $x_i$ axes such that the axes $z_i$, $x_i$ and $y_i$ provide a right-hand system. It is thus possible to define the work surface coordinate system which has the origin located on the end of the working tool 4 contacting the work surface. The data of the work surface coordinate system are then delivered to the coordinate conversion sections 11, 16, 22 and 123 each of which computes the conversion matrix for coordinate conversion between the work coordinate system and the base (reference) coordinate system, thereby executing the respective coordinate conversion operations.

Figure 25:
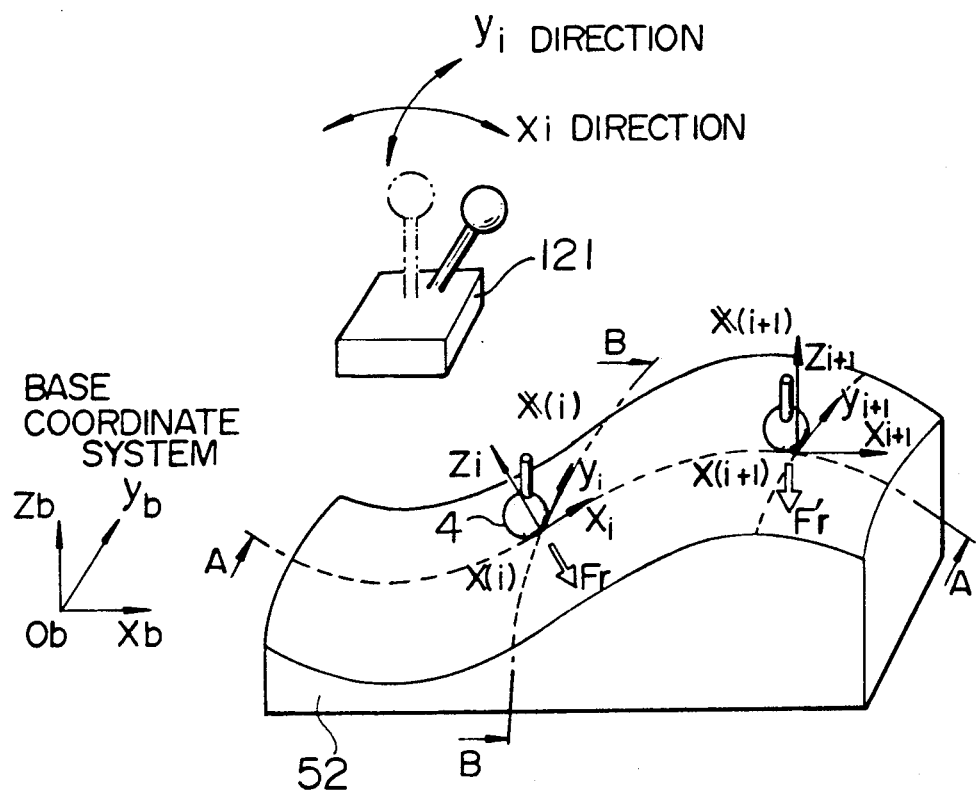
FIG. 25 is an illustration of a curved surface profiling operation performed by the control apparatus of FIG. 21.
Figure 26A:
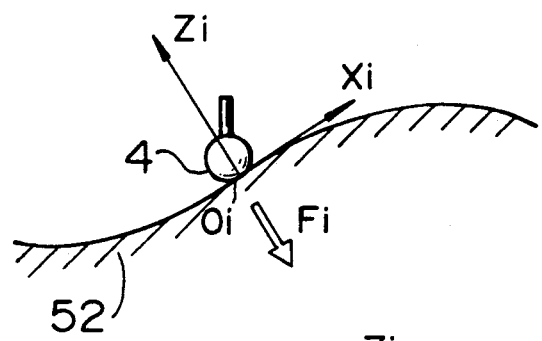
FIGS. 26(a) and 26(b) are sectional views taken along the lines A—A and B—B of FIG. 25, respectively.
Figure 26B:
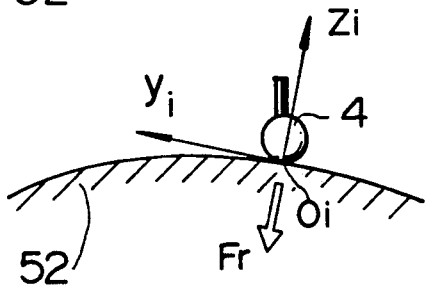

An example of the curved surface profiling operation in accordance with this embodiment will be explained in connection with FIGS. 25 and 26. In these Figures, the base coordinate system is represented by Ob-xbybzb. An assumption is made here that the working tool 4 is first held in contact with the work 52 at a certain instant at a position $\underline{x}(i)$ and is then moved in the next instant to a position $\underline{x}(i+1)$ while keeping a contact with the surface of the work 52.

For enabling the robot to perform such a task, the operator inputs the level of the force Fr in the z-axis direction of the work surface coordinate system by means of the force setting device 120. This value is input to the aforesaid comparator 12 so as to be used as the force command $\underline{f}r$. On the other hand, the working tool 4 is held in contact with the work surface so that the reactional force is detected by the force sensor 3. Then, as described before, the data on the work surface coordinate system are delivered to the coordinate conversion sections 11, 16, 22 and 123. The force command Fr from the force setting device 120 is then compared by the comparator 12 with the force value converted into the values of the work surface coordinate system. Then, the virtual compliance control computing section 17 performs a force control computation for generating the force Fr in the direction of the z-axis of the work surface coordinate system. In consequence, the working tool 4 is pressed onto the work surface in the direction normal thereto with the pressing force Fr.

In this state, the operator manually operates the two-dimensional input device 121 by tilting the lever in the direction $x'(i+1)$. The two-dimensional input device 121 decompose the moving direction into the components of the $x_i$ axis and $y_i$ axis of the work surface coordinate system, so that signals corresponding to these components are input to the coordinate conversion section 123 and the position command computing section 124. The new position command $x'r(i+1)$ as computed by the position command computing section 124 is input to the comparator 15 and the virtual compliance control computing section 17 performs the position control computation using the result of the comparison. In consequence, the working tool 4 is moved to reach the position $x(i+1)$ while being pressed with the force Fr onto the work surface in the direction normal to the work surface.

As will be understood from the foregoing description, this embodiment of the present invention enables the working tool 4 to be moved to a desired position on the work surface by profiling the curved surface of the work while keeping the working tool in contact with the work surface with a constant pressing force, simply by a manual operation of the two-dimensional input device 121, once the desired pressing force level is set through the force setting device 120.

The work surface coordinate system $x(i) - xi\ yi\ zi$ is momentarily renewed in accordance with the direction of the reactional force detected at each moment, so that the profiling operation can be performed easily while eliminating any risk for the moving direction to be set erroneously.

To sum up, this embodiment offers the following advantages.

(1) The manipulation is simplified to reduce fatigue of the operator because he can control the working tool with the same feeling as that in the control along a flat surface or plane, even if the work has a complicated curved configuration.

(2) When the system is applied to teaching operation, the teaching speed is increased by virtue of the simplified manipulation. Teaching of posture can be dispensed with when the posture of the working tool also is controlled, thus attaining a further speed-up of the teaching operation.

(3) Fatigue of the operator is reduced in, for example, grinding because the operator is not required to hold the working tool in his hand.

(4) Since the work surface coordinate system is used as the arbitrary coordinate system, the moving direction varies according to the curvature of the work surface. This enables the operator to grasp the moving distance and velocity as a matter of sense, thus contributing to a further improvement in the maneuverability.

What is claimed is:

1. A position/force control apparatus for use with a multiple-degree-of-freedom working machine such as a robot or a machine tool having at least two degrees of freedom of position and having a working tool adapted to move relative to an object to be worked for performing an operation, comprising:

first setting means for setting a position and/or posture command for commanding a position and/or posture of the working tool on said machine;

first detection means for detecting an instant position and/or posture of said working tool;

second setting means for setting a force and/or moment command for commanding a force and/or moment to be applied to said working tool;

second detection means for detecting an instant force and/or moment acting on said working tool;

coordinate conversion data means for providing coordinate conversion data on an arbitrary coordinate system associated with said object to be worked wherein said arbitrary coordinate system has its origin placed on an end of said working tool and includes coordinate axes of the same directions as lines normal to and one of tangential to and parallel to a surface of said object, and wherein the directions are changed with the relative movement between said working tool and said object to be worked;

first computing means for determining, from said position and/or posture command set by said first setting means and said instant position and/or posture detected by said first detection means, a position and/or posture error as values converted into said arbitrary coordinate system using said coordinate conversion data;

second computing means for determining, from said force and/or moment command set by said second setting means and said instant force and/or moment detected by said second detection means, a force and/or moment error as values converted into said arbitrary coordinate system using said coordinate conversion data;

third computing means for executing computation for position and force control of said working tool by making use of said position and/or posture error and said force and/or moment error obtained as values of the same arbitrary coordinate system by said first and second computing means, thereby determining an amount of control as values of said arbitrary coordinate system to be effected on said working machine;

fourth computing means for converting the control amount as values of said arbitrary coordinate system determined by said third computing means into an operation command for driving said working machine by using said coordinate conversion data;

means for outputting said operation command; and means for driving the working machine to control the working tool dependent upon said control amount determined by said third computing means based on said operation command.

2. A position/force control apparatus for use with a multiple-degree-of-freedom working machine according to claim 1, wherein said first computing means includes first means for determining a position and/or posture error between said position and/or posture command set by said first setting means and said instant position and/or posture detected by said first detection means, and second means for converting said position and/or posture error determined by said first means into said coordinate values of said arbitrary coordinate system using said coordinate conversion data, and wherein said second computing means includes third means for converting said instant force and/or moment detected by said second detection means into coordinate values of said arbitrary coordinate system using said coordinate conversion data, and fourth means for determining said force and/or moment error between said instant force and/or moment converted into the coordinate values of said arbitrary coordinate system by said third means and said force and/or moment command in terms of the coordinate values of said coordinate system set by said second setting means.

3. A position/force control apparatus for use with a multiple-degree-of-freedom working machine according to claim 2, wherein said first computing means further includes fifth means for converting said instant position and/or posture detected by said first detection means into coordinate values of a base coordinate system fixed to a space in which said working machine is situated, before determining said position and/or posture error by said first means, wherein said second computing means further includes sixth means for converting said instant force and/or moment detected by said second detection means into coordinate values of a reference coordinate system which have three orthogonal coordinate axes of the same directions as said base coordinate system and having the same origin as that of a hand coordinate system fixed to said working tool, before converting eh same into the coordinate values of said operation system by said third means;

and wherein said fourth computing means includes seventh means for converting the control amount determined by said third computing means into coordinate values of said base coordinate system and eighth means for converting said control amount in terms of the coordinate values of said base coordinate system into said operation command for the system for driving said working machine.

4. A position/force control apparatus for use with a multiple-degree-of-freedom working machine according to claim 1, wherein said first computing means includes fifth means for converting said instant position and/or posture detected by said first detection means into coordinate values of said arbitrary coordinate system using said coordinate conversion data, and sixth means for determining said position and/or posture error between said instant position and/or posture in terms of the coordinate values of said arbitrary coordinate system obtained by said fifth means and said position and/or posture command set by said first setting means, and wherein said second computing means includes seventh means for converting said instant force and/or moment detected by said second detection means into coordinate values of said arbitrary coordinate system using said coordinate conversion data, and eighth means for determining said force and/or moment error between the instant force and/or moment converted into the coordinate values of said arbitrary coordinate system by said seventh means and said force and/or moment command set by said second setting means.

5. A position/force control apparatus for use with a multiple-degree-of-freedom working machine according to claim 4, wherein said first computing means further includes ninth means for converting said instant position and/or posture detected by said first detection means into coordinate values of a base coordinate system fixed to a space in which said working machine is situated, before converting the same by said fifth means into the coordinate values of said arbitrary coordinate system, wherein said second computing means further includes tenth means for converting said instant force and/or moment detected by said second detection means into coordinate values of a reference coordinate system which have three orthogonal coordinate axes of the same directions as said base coordinate system and having the same origin as that of a hand coordinate system fixed to said working tool, before converting the same into the coordinate values of said arbitrary coordinate system by said seventh means;

and wherein said fourth computing means includes eleventh means for converting the control amount determined by said third computing means into coordinate values of said base coordinate system and twelfth means for converting said control amount in terms of the coordinate values of said base coordinate system into said operation command for said driving means.

6. A position/force control apparatus for use with a multiple-degree-of-freedom working machine according to claim 1, wherein said coordinate conversion data means provides, as said coordinate conversion data on said arbitrary coordinate system, those data on a work surface coordinate system having its origin placed on an end of said working tool and including coordinate axes of the same directions as lines normal to and tangential to the work surface, respectively.

7. A position/force control apparatus for use with a multiple-degree-of-freedom working machine according to claim 1, wherein said coordinate conversion data means provides, as said coordinate conversion data on said arbitrary coordinate system, data on a work surface coordinate system having its origin on an end of said working tool contacting said work surface and having three orthogonal axes one of which is directed in a direction normal to said work surface, wherein said first setting means includes two-dimensional input means for setting a direction of movement of said working tool, wherein said second setting means includes force setting means for setting a level of the force to be applied to said working tool, and wherein said third computing means conducts a computation for indicating the level of the force set by said force setting means for one of the three orthogonal axes of said work surface coordinate system, while conducting a computation for indicating the direction of movement set by said two-dimensional setting means on the remainder two of said three orthogonal axes.

8. A position/force control apparatus for use with a multiple-degree-of-freedom working machine according to claim 1, wherein said third computing means further includes fifth means for multiplying said position and/or posture error $\Delta x$ determined by said first computing means with a spring constant matrix K defining spring constants set for the respective coordinate axes of said arbitrary coordinate system, sixth means for effecting a dead zone computation $\Delta f$ by incorporating, in said force and/or moment error $\Delta f$ determined by said second computing means, dead zones set for the respective coordinate axes of said arbitrary coordinate system, seventh means for substrating the value $K \Delta x$ obtained by said fifth means from the value $\Delta f$ determined by said sixth means, and eighth means for effecting a predetermined characteristic compensation computation on the value $\Delta f - K \Delta x$ determined by said seventh means so as to determine a velocity command $v$ as said control amount.

9. A position/force control apparatus for use with a multiple-degree-of-freedom working machine according to claim 8, wherein said eighth means performs a virtual compliance control computation in accordance with the following formula, by making use of a virtual mass matrix M and a virtual viscosity coefficient matrix C:

$$M\dot{v} + Cv = \Delta f - K \Delta x$$

10. A position/force control apparatus for use with a multiple-degree-of-freedom working machine according to claim 1, wherein said coordinate conversion data means comprises:
 fifth computing means for computing a vector $v$ of a direction of movement of said working tool from said instant position detected by said first detection means;
 sixth computing means for computing a vector $f$ of a reactional force received by said working tool from said instant force detected by said second detection means; and
 seventh computing means for computing orthogonal unit vectors $i$, $j$ and $k$ from said reactional force vector $f$ computed by said sixth computing means and said moving direction vector $v$ computed by said fifth computing means;
 wherein said first, second and fourth computing means executes, by making use of said unit vectors (i, j and k computed by the seventh means as said coordinate conversion data, said coordinate conversion by using the cartesian coordinate system (i, j, k) formed by said unit vectors as said arbitrary coordinate system.

11. A position/force control apparatus for use with a multiple-degree-of-freedom working machine according to claim 10, wherein said seventh computing means computes the unit vector $k$ from said reactional force vector $f$ computed by said sixth computing means, and computes from said unit vector k and said moving direction vector $v$ computed by said fifth computing means, the unit vector $j$ as a unit vector orthogonal both to said unit vectors $k$ and $v$ and the unit vector $i$ as a unit vector orthogonal to said unit vectors $k$ and $v$.

12. A position/force control apparatus for use with a multiple-degree-of-freedom working machine according to claim 11, wherein said seventh computing means computes a normal direction vector $n$ in the direction normal t the work surface from said reactional force vector $f$ computed by said sixth computing means, and comprises the unit vector $k$ from said normal direction vector $n$ as a unit vector thereof.

13. A position/force control apparatus for use with a multiple-degree-of-freedom working machine according to claim 10, wherein said seventh computing means computes the unit vector $j$ from said moving direction vector $v$ computed by said fifth computing means as a unit vector of the direction of movement of said working tool, and computes, from said unit vector $j$ and said reactional force vector $f$ computed by said first computing means, the unit vector $j$ as a unit vector orthogonal to said vectors $i$ and $f$ and the unit vector $k$ as a unit vector orthogonal to said unit vector i and contained in the plane defined by said unit vectors $i$ and $f$.

14. A position/force control apparatus for use with a multiple-degree-of-freedom working machine according to claim 10, further comprising:
 memory means for storing said unit vectors $i$, $j$ and $k$ computed by said seventh computing means, together with other teaching data; and
 play-back means for outputting the stored data during play-back operation.

15. A position/force control apparatus for use with a multiple-degree-of-freedom working machine according to claim 10, wherein said seventh computing means computes, from the moving direction vector $v$ computed by said fifth computing means and the reactional force vector $f$ computed by said sixth computing means, the unit vectors $i$, $j$ and $k$ as unit vectors of a work surface coordinate system having its origin on an end of said working tool and including coordinate axes of the same directions as lines normal to and tangential to said work surface, respectively.

16. A position/force control apparatus for use with a multiple-degree-of-freedom working machine according to claim 1, further comprising:
 third setting means for pre-setting a plane which intersects said work surface;
 fifth computing means for computing a vector $f$ of a reactional force received by said working tool from the instant force detected by said second detection means;
 sixth computing means for computing a normal direction vector $n$ of the direction normal t the work surface from at least said reactional force vector $f$ computed by said fifth computing means;
 tenth computing means for computing, from said normal direction vector $n$ computed by said sixth computing means, a unit vector $k$ of said normal direction vector, and computing, from said normal direction vector $n$ and said plane pre-set by said third setting means, a unit vector $i$ in the direction of a line of intersection between a tangential plane of said work surface and the pre-set plane, and computing a unit vector $j$ orthogonal both to said unit vectors $k$ and $j$; and
 wherein said first and second or fourth computing means executes, by making use of said unit vectors $i$, $j$ and $k$ computed by said tenth means, said coordinate conversion by using the Cartesian coordinate system (i, j, k) formed by said unit vectors as said arbitrary coordinate system.

17. A position/force control apparatus for use with a multiple-degree-of-freedom working machine according to claim 16, wherein said coordinate conversion data means further comprises:

eighth computing means for computing a vector $\underline{v}$ of a direction of movement of said working tool from said instant position detected by said first detection means; and wherein said sixth computing means computes a vector $\underline{p}$ orthogonal both to said reactional force vector $\underline{f}$ computed by said eighth computing means and said moving direction vector $\underline{v}$ computed by said eleventh computing means, and computes as said normal direction vector $\underline{n}$ normal to said work surface a unit vector orthogonal both to said moving direction vector $\underline{v}$ and said vector $\underline{p}$.

18. A position/force control apparatus for use with a multiple-degree-of-freedom working machine as claimed in claim 1, wherein said coordinate conversion data means provides coordinate conversion data on said arbitrary coordinate system associated with a curved surface of said object to be worked and further said arbitrary coordinate system has its origin placed on an end of said working tool and includes coordinate axes of the same directions as lines normal to and tangential to the curved surface of the object that are changed with relative movement between said working tool and said object.

19. A position/force control apparatus for use with a multiple-degree-of-freedom working machine such as a robot or machine tool having at least two degrees of freedom of position and having a working tool adapted to move relative to an object to be worked for performing an operation, comprising:

first setting means for setting a position and/or posture command for commanding a position and/or posture of the working tool on said machine;

first detection means for detecting an instant position and/or posture of said working tool;

second setting means for setting a force and/or moment command for commanding a force and/or moment to be applied to said working tool;

second detection means for detecting an instant force and/or moment acting on said working tool;

coordinate conversion data means for providing coordinate conversion data on an arbitrary coordinate system associated with said object to be worked wherein said arbitrary coordinate system has its origin placed on an end of said working tool and includes coordinate axes of the same directions as lines normal to and one of tangential to and parallel to a surface of said object, and wherein the directions are changed with the relative movement between said working tool and said object to be worked;

first computing means for converting the instant position and/or posture detected by said first detection means into coordinate values of said arbitrary coordinate system using said coordinate conversion data;

second computing means for determining a position and/or posture error between said instant position and/or posture in terms of the coordinate values of said arbitrary coordinate system obtained by said first computing means and said position and/or posture command in terms of the coordinate values of said arbitrary coordinate system set by said first setting means;

third computing means for converting said instant force and/or moment into coordinate values of said arbitrary coordinate system using said coordinate conversion data;

fourth computing means for determining a force and/or moment error between the instant force and/or moment in terms of said arbitrary coordinate system obtained by said third computing means and said force and/or moment command set by said second setting means;

fifth computing means for conducting computation for position and force control of the working tool by making use of the position and/or posture error and the force and/or moment error obtained as values of the same arbitrary coordinate system by said second and fourth computing means, thereby determining an amount of control as values of said operation coordinate system to be effected on said working machine;

sixth computing means for converting the control amount as values of said arbitrary coordinate system determined by said fifth computing means into an operation command for driving said working machine by using said coordinate conversion data;

means for outputting said operation command; and means for driving the working machine to control the working tool dependent upon said control amount determined by said fifth computing means based on said operation command.

20. A position/force control apparatus for use with a multiple-degree-of-freedom working machine as claimed in claim 19, wherein said coordinate conversion data means provides coordinate conversion data on said arbitrary coordinate system associated with a curved surface of said object to be worked and further said arbitrary coordinate system has its origin placed on an end of said working tool and includes coordinate axes of the same directions as lines normal to and tangential to the curved surface of the object that are changed with relative movement between said working tool and said object.

21. A position/force control apparatus for use with a multiple-degree-of-freedom working machine such as a robot, or a machine tool having at least two degrees of freedom of position and having a working tool adapted to move relative to an object to be worked for performing an operation, comprising:

first setting means for setting a position and/or posture command for commanding a position and/or posture of the working tool on said machine;

first detection means for detecting an instant position and/or posture of said working tool;

second setting means for setting a force and/or moment command for commanding a force and/or moment to be applied to said working tool;

second detection means for detecting an instant force and/or moment acting on said working tool;

coordinate conversion data means for providing coordinate conversion data on an arbitrary coordinate system associated with said object to be worked wherein said arbitrary coordinate system has its origin placed on an end of said working tool and includes coordinate axes of the same directions as lines normal to and one of tangential to and parallel to a surface of said object and wherein the directions are changed with the relative movement between said working tool and said object to be worked;

first computing means for determining a position and/or posture error from said position and/or posture command set by said first setting means and said instant position and/or posture detected by said first detection means;

second computing means for converting the position and/or posture error determined by said first computing means into coordinate values of said arbitrary coordinate system using said coordinate conversion data;

third computing means for converting said instant force and/or moment into coordinate values of said arbitrary coordinate system using said coordinate conversion data;

fourth computing means for determining a force and/or moment error between the instant force and/or moment in terms of said arbitrary coordinate system obtained by said third computing means and the force and/or moment command set by said second setting means;

fifth computing means for conducting computation for position and force control of the working tool by making use of the position and/or posture error and said force and/or moment error obtained as values of the same arbitrary coordinate system by said second and fourth computing means, thereby determining an amount of control as values of said arbitrary coordinate system to be effected on said working machine;

sixth computing means for converting the control amount as values of said arbitrary coordinate system determined by said fifth computing means into an operation command for driving said working machine by using said coordinate conversion data;

means for outputting said operation command; and means for driving the working machine to control the working tool dependent upon said control amount determined by said fifth computing means based on said operation command.

22. A position/force control apparatus for use with a multiple-degree-of-freedom working machine as claimed in claim 21, wherein said coordinate conversion data means provides coordinate conversion data on said arbitrary coordinate system associated with a curved surface of said object to be worked and further said arbitrary coordinate system has its origin placed on an end of said working tool and includes coordinate axes of the same directions as lines normal to and tangential to the curved surface of the objects that are changed with relative movement between said working tool and said object.

* * * * *